United States Patent [19]

Strehler

[11] Patent Number: 5,122,984
[45] Date of Patent: Jun. 16, 1992

[54] PARALLEL ASSOCIATIVE MEMORY SYSTEM

[76] Inventor: Bernard Strehler, 2235 25th St., #217, San Pedro, Calif. 90732

[21] Appl. No.: 1,233

[22] Filed: Jan. 7, 1987

[51] Int. Cl.$^5$ .............................................. G11C 15/00
[52] U.S. Cl. ................................ 365/49; 365/230.03; 364/956.1; 364/956; 364/253; 364/253.1
[58] Field of Search ................ 365/49, 189.07, 230.03; 364/200 MS File, 900 MS File

[56] References Cited

U.S. PATENT DOCUMENTS

| | | | |
|---|---|---|---|
| 4,575,818 | 3/1986 | Almy et al. | 365/49 |
| 4,670,858 | 6/1987 | Almy | 365/49 |
| 4,755,974 | 7/1988 | Yamada et al. | 365/49 |
| 4,766,568 | 8/1988 | McGregor et al. | 365/49 |
| 4,959,811 | 9/1990 | Szczepanek | 365/49 |

FOREIGN PATENT DOCUMENTS 2182789  5/1987  United Kingdom .................. 365/49

*Primary Examiner*—Glenn Gossage

[57] ABSTRACT

A plurality of memory units, called "mnemonds", is each capable of storing data elements and of responding to requests to recover those data elements from storage. A plurality of mnemonds is arranged in a linear array, with each mnemond connected to be capable of responding to signals from its neighbor mnemonds. When a data structure is stored, each array stores a copy of that data structure, either allocating the elements of the data structure one per mnemond (with possible wrap-around to the beginning of the linear array) or allocating the data structures to one or a predetermined number of mnemonds. When a data structure is to be located in memory through cueing, precise correspondences between data stored and cueing data entered identify the unique location or locations of said matching data; when a data structure is to be recovered from memory, identification of its location permits recovery of data in that location or in that location and succeeding locations. One or more arrays, of differing lengths so that the allocation of data elements is also differing, is collected to form a memory bank. One or more memory banks operates under the control of a central control unit.

27 Claims, 11 Drawing Sheets

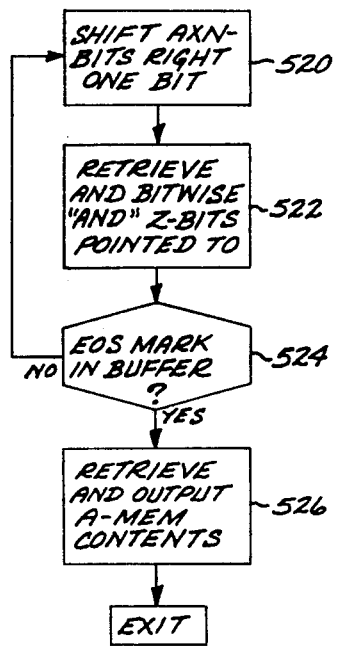
FIG.5
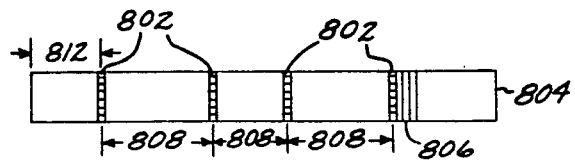
FIG.8
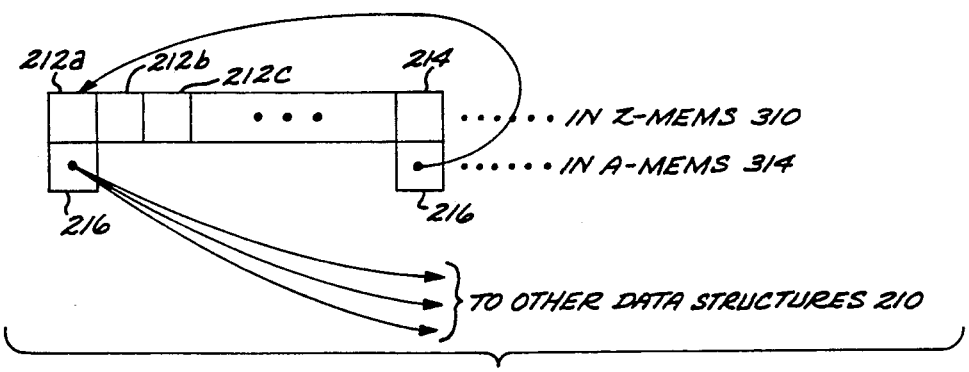
FIG.6
FIG.7
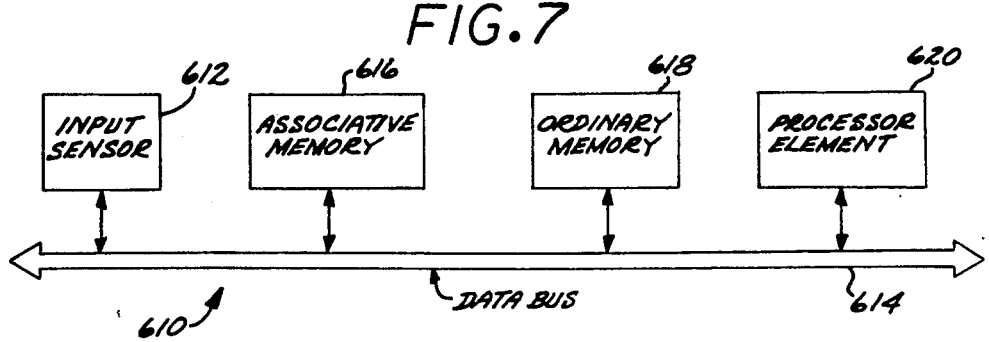

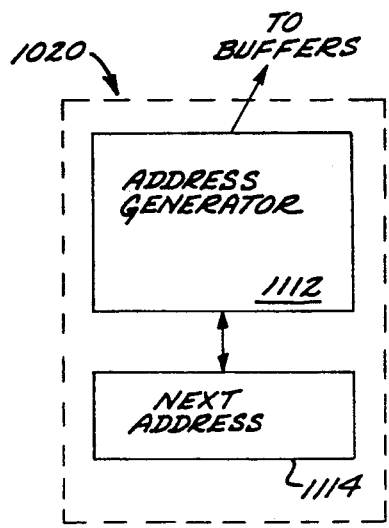
FIG.14A
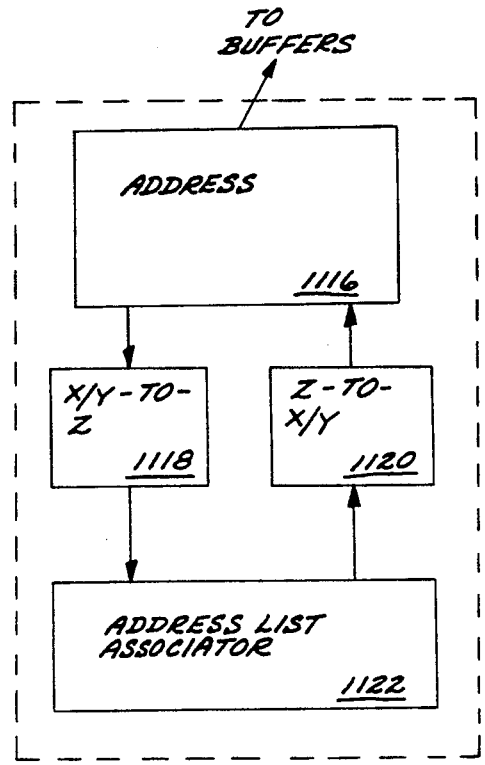
FIG.14B
FIG.15A
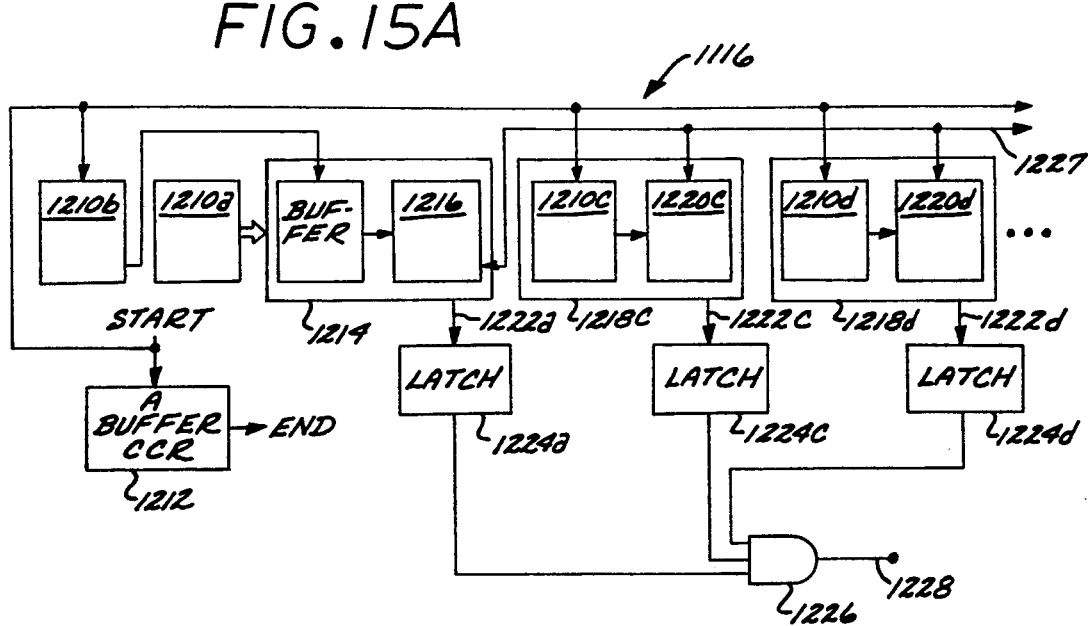

PARALLEL ASSOCIATIVE MEMORY SYSTEM

BACKGROUND OF THE INVENTION

1. Field of the Invention

The present invention relates to the field of computer memory systems. More specifically, it relates to the field of parallel associative contents-addressable electronic memory systems.

2. Description of Related Art

Traditional computers and computing systems comprise at least four major subsystems: input, output, processing, and memory. The input and output subsystems are used to connect a computer to the outside world, the processing subsystem is used to perform calculations and to manipulate information, and the memory subsystem is used to record information for later use. A memory in the memory subsystem typically comprises a plurality of memory cells, each of which is used for storing one datum of the information. A processor in the processor subsystem may store ("write") data into memory by presenting that data and indicating the location of one or more cells where the data is to be stored, and may retrieve ("read") data from the memory by indicating one or more cells where the data had been stored, and accepting the data which the memory presents in response.

Sizable and complex computing systems generally work with large amounts of information, and therefore require a sizable memory with a large number of memory cells. Locating information in a sizable memory may require the careful organization of data structures to be stored therein, assiduous searching of these data structures by the processing subsystem, and expenditures of much time and processing power. Accordingly, there is a need for memory subsystems in which specific stored information can be located with significantly reduced time and effort.

Related to the problem with presently available memory systems of locating information in a sizable memory is the problem of processing large amounts of data. Presently available memory systems generally allow a processor to manipulate only one data element (or only a small number of data elements) at once. When a processor works with large amounts of information, this requirement of manipulating only a small number of data elements restrains it from operating at high speeds. Paradoxically, adding more memory data elements only slows the processing operation, as the presence of more memory data elements results in the requirement of individual access and processing for each of them. There is a need for memory subsystems in which information can be manipulated in large bundles simultaneously.

Accordingly, it is an object of the present invention to provide an improved method for accessing and referencing stored data in memory. It is another object of the present invention to provide an improved memory storage device which operates associatively, in parallel, is content-addressable, and which is easily extensible to any desired size. These and other objects of the present invention will be clear after an examination of the drawings, the description, and the claims herein.

SUMMARY OF THE INVENTION

An associative memory system is constructed which can store data elements in a plurality of memory units ("mnemonds"). Each mnemond may be associated with neighbor mnemonds, and the mnemonds are connected by these neighbor relations to form one or more mnemond structures ("arrays"). The arrays are made to differ slightly from one another, so that data structures which are redundantly stored in multiple arrays may be overlaid with other data structures and later recovered by examination of slight differences between arrays.

Without limiting the generality of the invention, the mnemonds in each array may be generally arranged to form a ring-like structure, with a differing number of mnemonds in each array. A serial data structure (e.g. representing a spoken or written sentence) may be stored sequentially, one data element per mnemond, with possible wrap-around due to the ring-like structure of the arrays. A non-serial data structure (e.g. representing a picture image) may be entirely stored in a single specific mnemond of each array, or may be broken into subparts which are stored in specific sequential mnemonds. Each mnemond may be made capable of storing one or more data elements by providing the mnemond with storage indicators for each possible stored data value.

Data structures may be referred to by address values which themselves may be stored in the mnemonds which store data structures, and may themselves form an association network for allowing associative relation of data structures. Such representations of address values are redundantly stored in multiple arrays, and these stored representations of address values are made to differ slightly from one another so that they may be later recovered by examination of the slight differences between representations.

Without limiting the generality of the invention, the representations of address values may generally comprise multiple indicator bits in a single register, with the numeric differences between indicator bit positions combined to form absolute address values. This representation structure allows informational tags to be attached to address values and used by a control system in conjunction with those address values. Absolute address values may be manipulated to trace and recover the associative relations of data structures.

A programmed shift register and a cycle counter register are shown which allow a plurality of program instructions to be executed in parallel and without complex program control. Simple means are shown for sequencing and conditional branching of program steps, for "fork" and "join" process control operations, and for counting loop operations, which require only minimal hardware and software control. Without limiting the generality of the invention, program shift registers and cycle counter registers may be generally employed to implement the method steps of a parallel associative contents-addressable electronic memory system.

BRIEF DESCRIPTION OF THE DRAWINGS

FIG. 5 shows a flowchart of a method of recovering data located in memory, and associated registers.

FIG. 6 shows a method of associating new data with an associative key.

FIG. 7 shows a block diagram of an exemplary embodiment where actual retrieval of associated data is not required.

FIG. 8 shows the structure of a memory address pointer.

FIG. 14A and 14B are block diagrams of address translation hardware for a control system.

FIG. 15A is a block diagram of an address extractor and demultiplexer.

DESCRIPTION OF THE PREFERRED EMBODIMENT

Figure 1:
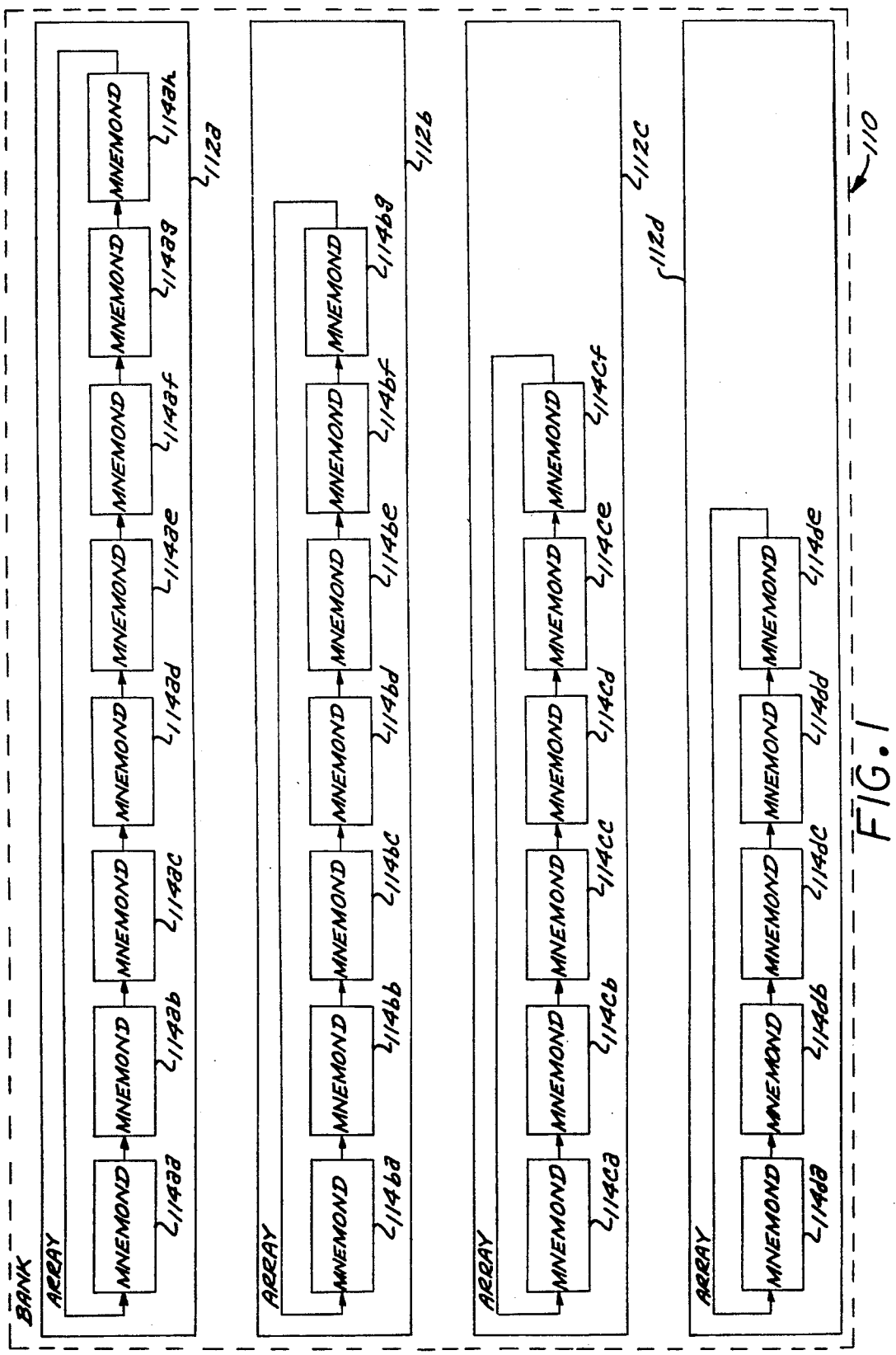
FIG. 1 is a block diagram of an exemplary memory bank.

FIG. 1 is a block diagram of a memory bank 110. The memory bank 110 comprises one or more arrays 112 (e.g. 112a–d), each of which comprises a plurality of mnemonds 114 (e.g. 114aa–ah 114ba–bg). Within each array, mnemonds are arranged as a linear array and connected in a ring structure, so that each mnemond 114 (e.g. 114ab) has a left-hand neighbor (e.g. 114aa), and a right-hand neighbor (e.g. 114ac). Each mnemond 114 is capable of storing data elements and of responding to requests to recover those data elements from storage.

Within each bank 110, the first array 112a comprises a number of mnemonds 114aa–ah. In this example there are eight mnemonds 114aa–ah in the first array 112a, but it will be clear to one of ordinary skill in the art that most any number of mnemonds 114 in the first array 112a will do. When multiple arrays are used, so as to permit unambiguous recovery of data stored redundantly within a bank, each succeeding array 112b–d comprises one fewer mnemonds than its preceding array—thus in this example there are seven mnemonds 114ba–bg in the second array 112b, mnemonds 114ca–cf in the third array 112c, and five mnemonds 114da–de in the fourth array 112d.

Figure 2:
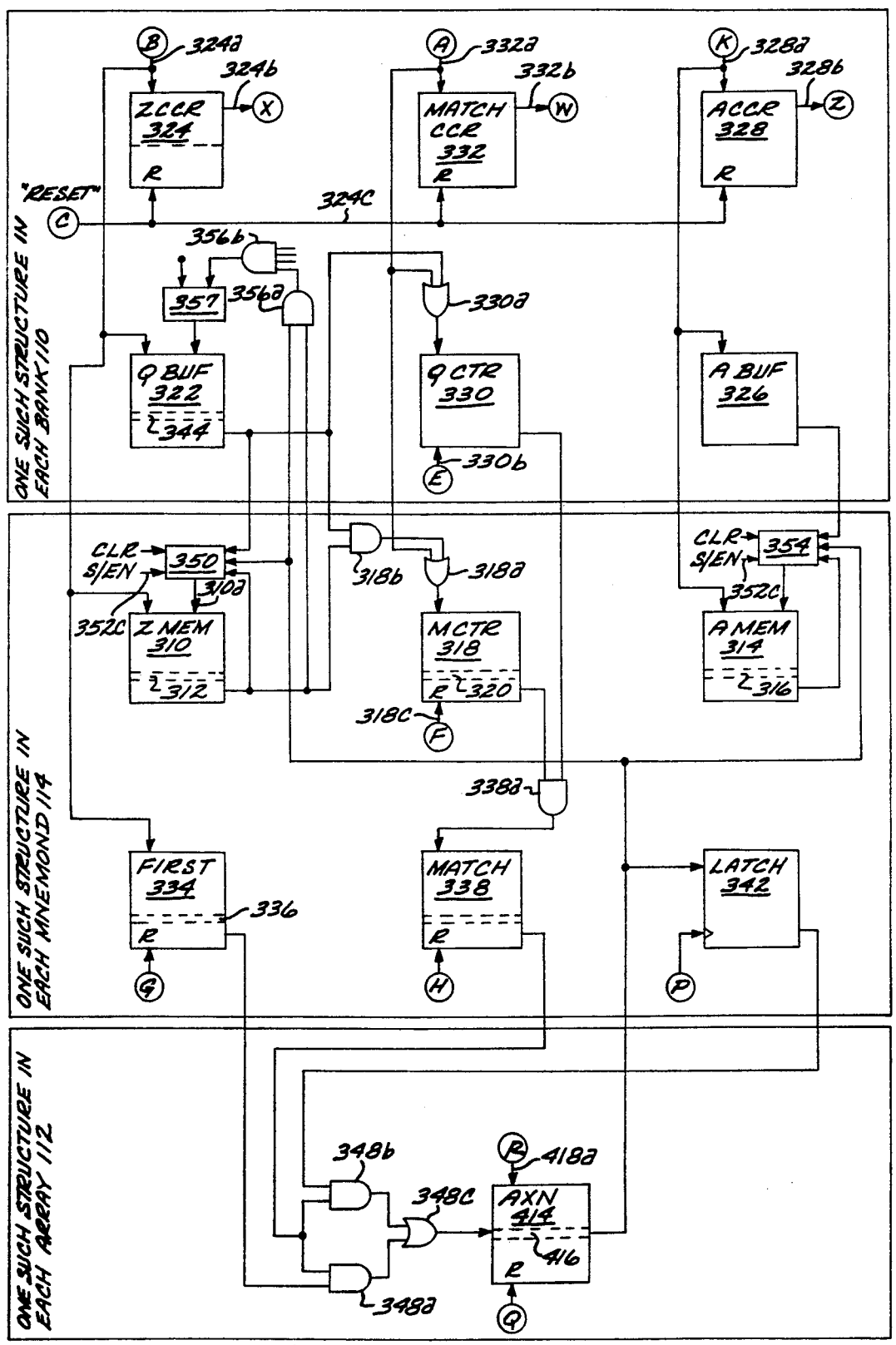
FIG. 2 is a block diagram of a mnemond usable in the invention.

FIG. 2 is a block diagram of a mnemond 114 and its interface to bank 110 control structures. Each mnemond 114 comprises a Z-mem 310 for storing data elements. The Z-mem 310 comprises a register with a plurality of Z-bits 312. In a preferred embodiment, 96 Z-bits are used, one for each printing character in the ASCII character set. The ASCII character set is a standard set of character codes which is well-known in the art. A character value is stored in the Z-mem 310 by setting the Z-bit 312 which corresponds to that character value to a logical "1". Because it comprises a plurality of Z-bits 312, a single Z-mem 310 is capable of storing representations of a plurality of character values simultaneously. However, the number of character values stored may be less than the number of character values entered, because when a given character value is stored twice or more (redundantly) in a single mnemond 114, it is still only recorded once. FIG. 2 will be discussed in more detail below.

Figure 3A:
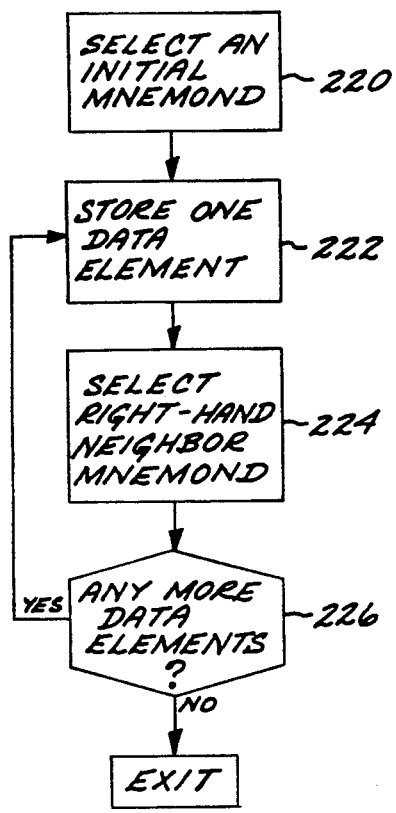
FIG. 3A shows a flowchart of a method of storing data.
Figure 3B:
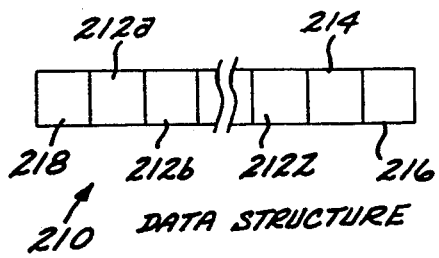
FIG. 3B shows registers associated with that method.

FIG. 3A shows a flowchart of the method of storing sequential data, and related registers. As shown in FIG. 3B, a bank 110 stores a data structure 210, comprising a set of data elements 212 (e.g. 212a–z), by causing each array 112 to store a copy of that data structure 210. An array 112 (e.g. 112a) stores a copy of a data structure 210 by allocating the data elements 212a–z one per mnemond 114 (e.g. 114aa–ah), with the first data element 212a allocated to a selected mnemond (e.g. 114ad) and each succeeding data element (e.g. 212b) allocated to the right-hand neighbor (e.g. 114ae) of the preceding mnemond 114. The components 214, 216 and 218 respectively comprise an "end mark" 214, a combination of bits in the Amem register 314 that designate the beginning location of the data combination stored in memory and 218 a beginning of stored data marker. These components are more fully described with reference to the details of FIGS. 3B and 5. Because the mnemonds 114 in each array 112 are connected in a ring structure (in a preferred embodiment of the invention), it may occur that one or more mnemonds 114 store more than one data element 212 when storage of the data structure 210 has "wrapped around" the ring structure. Because each array 112 records a copy of the data structure 210, and because each array 112 comprises a differing number of mnemonds 114, particular sets of data elements 212a–z stored by each mnemond 114 will differ in different arrays 112, even though identical data structures 210 are stored therein.

Therefore, at step 220, a psuedorandom number generator ("PRNG") is used to select an initial mnemond 114 (e.g. 114ad) in each array 112. PRNGs are well-known in the art, and most any PRNG will do. In a preferred embodiment, each array is assigned a prime number, and the initial mnemond 114 in each array which is chosen for each successive sequence is simply the successive integer multiple of the prime number assigned to that array, with wrap-around when the length of that array is exceeded. The array is assigned a prime number which does not evenly divide its length.

The seed value for the PRNG is called an "address symbol". By use of a PRNG as disclosed herein, address symbols may be freely converted to sequences of individual selected mnemonds 114 in each array 112, and back. Address symbols may also be ordered such that a "next" address symbol is always calculable from a given address symbol.

At step 222, a data element 212 is stored in the selected mnemond 114 for each array 112. At step 224, the right-hand neighbor of the selected mnemond 114 for each array 112 is made the new selected mnemond 114. At step 226, the data structure 210 is tested for the presence of further data elements 212. If further data elements 212 exist, control is transferred to step 222 to form a loop. Otherwise, the method of storing data is complete, and no further steps are taken.

In a preferred embodiment of the invention, several steps are taken to optimize this storage mechanism for text character strings. Text character strings usually concentrate most of their character values in a few common characters, exacerbating the redundancy noted above by causing unequal use of character storage locations. To compensate for this, and thereby cause approximately equal use of all character storage locations within a single mnemond, when a character string is stored in an array 112, each succeeding character value may be offset one more than the preceding character value, so that the redundancy noted above has reduced effect. One particular common character is the space, which is treated specially—it is simply not stored at all.

For example, to store the character string "TO BE OR NOT TO BE", the character value for "T" would be stored in the first mnemond 114aa used in each array, the character value for "P" ("O" offset by one) would be stored in the second mnemond 114ab used, the character value for "E" ("B" offset by three) would be stored in the fourth mnemond 114ad used, the character value for "I" ("E" offset by four) would be stored in the fifth mnemond 114ae used, and so on until the character value for "V" ("E" offset by 17) would be stored in the last mnemond 114b used, after a double wrap-around.

For certain data, it may be desirable to store, rather than a single copy of the data, a pattern of copies of the data which differ but which are closely related. An example of such a pattern may be found in storage of visual and voice data for later retrieval, as visual and voice data may be subject to significant variation in replication by a source, as well as significant error in sensing by a sensor device. Other and further information about sensing and replication of visual and voice data may be found in a co-pending application, "VISUAL/VOICE INPUT RECOGNITION SENSOR", Ser. No. 07/001,161, now U.S. Pat. No. 4,891,602.

Figure 4A:
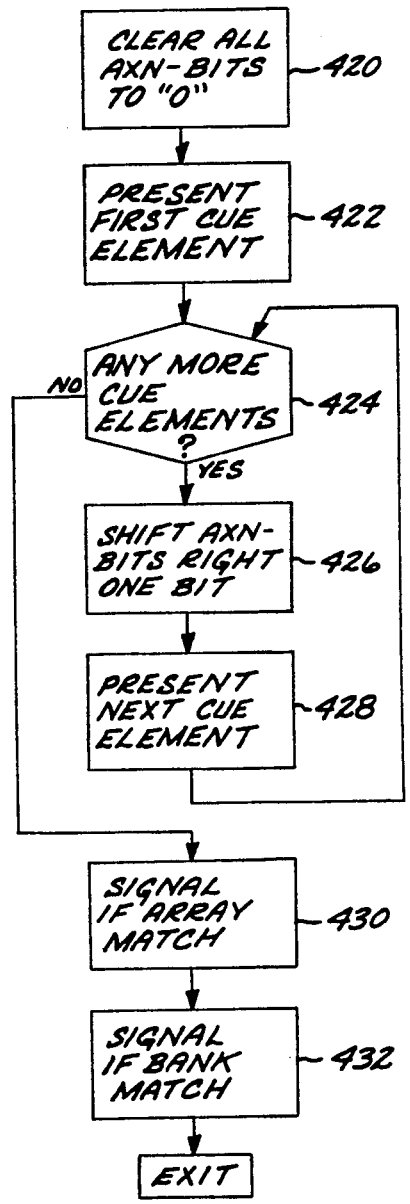
FIG. 4A shows a flowchart or a method of locating data in memory.

Referring now to FIG. 4A, to effect retrieval of stored data structures 210 (FIG. 3B) which are close but not exact matches of cue structures 410, two clear alternatives are presented. A first alternative is to allow a match to be recognized where the cue structure 410 is closely related to a stored data structure 210, but is not necessarily an exact match. For example, a mnemond 114 may declare a mnemond match when a cue element 412 matches a data element 212 stored in that mnemond 114 or matches a data element 212 stored in a neighbor mnemond 114. A second alternative is to store a pattern of data structures 210 such that a closely related cue structure 410 will be exactly replicated in the pattern and will exactly match one of the stored data structures 210.

A variation of the first alternative is applied when matching cue structures 412 or data structures 212 which include space characters. As noted above, in a preferred embodiment, the space character is not stored in any mnemond 114 and is never a data element 212. Accordingly, when a cue structure 410 is presented which would ordinarily include a space character, the space character is replaced with a "wild card" character which is matched by all mnemonds 114. Thus a cue structure 410 including one or more space characters will not fail to match a stored data structure 210 due to the lack of space characters stored as data elements 212.

While the structure of a mnemond 114 could easily be altered to accept matches which are not quite exact, in an embodiment where matches with closely related cues are desired the second alternative above is chosen. It is preferred to store each such closely related pattern as a stored data structure 210 and to require that each mnemond 114 make an exact match. This simplifies the hardware components of each mnemond 114 and allows the exactness of the match to be easily and flexibly altered by suitable tailoring of parameters for control software which may decide what data structures 210 to actually store in each bank 110. Each stored data structure 210 may also have a "preference" weighting assigned to it by inclusion of a "preference" value in a stored memory address pointer 216, as further disclosed herein with reference to FIG. 8.

FIG. 4A shows a flowchart of the method of locating data in memory, and related registers. A bank 110 (FIG. 1) locates a data structure 210 previously stored in memory by presenting a cue structure 410 comprising a set of cue elements 412 (e.g. 412a-z), simultaneously to each array 112 for matching. The cue structure 410 is successfully detected and its location identified if each array 112 declares an array match (i.e. a match between the cue structure 410 and data stored in that array 112).

An array 112 (e.g. 112a) locates a data structure 210, previously stored in memory, by presenting each succeeding cue element 412 to all its mnemonds 114 at once, allowing each mnemond 114 to compare the cue element 412 with its Z-mem 310. Each mnemond 114 (e.g. 114ad) declares a mnemond match (i.e., a match between a data element 212 and data stored in that mnemond 114) if and only if the cue element 412 (e.g. 412b) is present in its Z-mem 310 and either (1) this is the first cue element 412a, or (2) its left-hand neighbor (e.g. 114ac) declared a mnemond match for the preceding cue element 412 (e.g. 412a). An array 112 declares an array match if and only if a single mnemond 114 declares a mnemond match for the last cue element 412 of the cue structure 410. Then, if all arrays 112 in a bank 110 declare an array match, the cue structure 410 is successfully detected as being present in memory and its location is simultaneously identified.

Note that a data element 212 may comprise one or more data points 312, i.e. Z-bits 312 which are set to a logic "1" in a Z-mem 310. More than one data point 312 per data element 212 is generally envisioned for picture data rather than ASCII text. Similarly, a cue element 412 may comprise one or more cue points 344. Each cue point 344 must match a data point 312 for a mnemond match.

Therefore, at step 420, each array 112 has an AXN-register 414 (shown in FIG. 2), comprising a plurality of AXN-bits 416 (shown in FIG. 2), one per mnemond 114, and clears all the AXN-bits 416 to a logical "0". At step 422, the first cue element 412 (e.g. 412a) is presented to each mnemond 114 in the array 112 simultaneously, and each mnemond 114 compares the cue element 412 with its Z-mem 310, declaring a mnemond match if the cue element 412 is present in its Z-mem 310. Each mnemond 114 which declares a mnemond match sets its AXN-bit 416 to a logical "1".

At step 424, the cue structure is tested for the presence of further cue elements 412. If further cue elements 412 exist, control is transferred to step 426 to start a loop. Otherwise control is transferred to step 430. At step 426, each array 112 shifts the AXN-register 414 rightward one bit, thus shifting the AXN-bit 416 associated with each mnemond to the AXN-bit 416 immediately to its right in the AXN-register 414. At step 428 the next cue element 412 is presented to all mnemonds 114 in the array 112 whose corresponding AXN-bit is in the "1" state 416 and each such mnemond 114 compares the cue element 412 with its Z-mem 310, declaring a mnemond match if the cue element is present in its Z-mem 310. Each such mnemond 114 which fails to declare a mnemond match clears its AXN-bit 416 to a logical "0"; otherwise the AXN-bit 416 for that mnemond 114 remains set to a logical "1". Control is then transferred to step 424 to complete the loop.

At step 430, each array 112 declares an array match if and only if a single AXN-bit 416 in its AXN-register 414 remains set to a logical "1"; this indicates that the complete cue structure 410 is present in the mnemonds which comprise that array 112. At step 432, the bank 110 declares a bank match if and only if all its arrays 112 declare an array match. The method of locating data in memory is then complete, and no further steps are taken.

Once the cueing structure 410 is matched by each array 112 in a bank 110 (causing the bank 110 to declare a bank match), a stored data structure 210 which contains that cueing structure 410 as a substring has been detected. In a preferred embodiment, the stored data structure 210 may include, at its end, an end of structure mark 214 and a memory address pointer 216 to its starting location, and at its start, a start of structure mark 218 (FIG. 3B). The memory address pointer 216 points to the beginning of the stored data structure 210 and thus allows the entire stored data structure 210 to be retrieved. In an alternate embodiment, the memory address pointer 216 may point to an indirect table, to an address in conventional memory, or to some other location to facilitate reference to the entire stored data structure 210.

Thus, once a terminal substring of the stored data structure 210 has been located, the end of structure mark 214 and the memory address pointer 216 can be retrieved in addition to the terminal data elements 412 of the data structure 210. At the completion of the method of locating data in memory (disclosed with reference to FIG. 4B), the location of AXN-bits 416 set to a logical "1" corresponds, in each array, to the location of the next (uncued) data element 412 stored in the bank 110 as part of a single data structure 210. The terminal data elements are associated with the cue structure 412 previously presented, just as data is associated with an associative key in a contents-addressable memory. These terminal data elements 412 may then be retrieved from memory, as described with reference to FIG. 5.

FIG. 5 shows a flowchart of the method for retrieval of the terminal part of a stored data structure 210. Because each array 112 may store more than one stored data structure 210, mnemonds 114 which follow the cueing structure 410 in each array 112 may contain values which do not unambiguously indicate their data elements 212, the end of structure mark 214, or the memory address pointer 216. In general, mnemonds 114 in multiple arrays 112 must be examined (e.g. by bitwise ANDing their contents) to disambiguate these values and thus detect the presence of common stored data elements 212, the end of structure mark 214, the memory address pointer 216, and the start of structure mark 218. However, due to possible spurious combinations of data, values may still lead to detection of ambiguous stored data elements 212; these ambiguous stored data elements 212 may be disambiguated through their context.

Therefore, at step 520, the AXN-register 414 is shifted one position to the right in each of the arrays 112 in that bank 110. At step 522, the contents of the Z-mem 210 of all mnemonds 114 whose AXN-bit 416 is in a logical "1" are retrieved; these contents are bitwise ANDed with each other and the result stored in an output Q-buf 344 (shown in FIG. 2), whose structure is that of a Z-mem 310. At step 524 the contents of the output Q-buf 344 is examined for the presence of an end of structure mark 214. If an end of structure mark 214 is detected, control is passed to step 526, otherwise the recovered data element 212 is output for processing, after which control is returned to step 520. At step 526, the content of the A-mem 220 for that mnemond 114 is recovered, and output for processing. The method of retrieving data from memory is then complete, and no further steps are taken.

Because stored data is located in memory and retrieved from memory based on its contents (i.e. the memory system is a contents-addressable and "associative" memory), it is desirable to prevent storage of an associative key (i.e. a data structure 210) in at least two different sets of mnemonds 114 in memory. Therefore, before actual storage of any data in memory takes place, a cueing search is performed to determine that the same data is not already present in memory. The cueing search is further disclosed with reference to FIG. 4B. If the associative key is already present in memory, storage does not proceed normally; instead the new data is associated with the previously-stored associative key. Associating new data with an associative key is further disclosed with reference to FIG. 6.

It will be clear to one of ordinary skill in the art that there are two distinct operations which are disclosed above. First, an associative key can be located in memory, i.e. its presence can be detected and its location identified: once the cueing structure 410 is matched by each array in a bank, its presence has been detected and its location has been identified. Second, data which is associated with that key can be retrieved from memory: once the location of the cueing structure 410 has been identified, the data which follows that cueing structure 410 in a stored data structure 210 is associated with the cueing structure 410 and can be retrieved. Recovery of the memory address pointer 216, and thus the entire stored data structure 210, generally depends upon location and retrieval of the terminal portion of the stored data structure 210. It will also be clear to one of ordinary skill in the art that the redundancy of multiple arrays 112 is only necessary when the cueing structure 410 is not a terminal substring of the stored data structure 210, i.e. only for the retrieval operation, and that where retrieval of associated data stored in a contents-addressable memory is not required, the data need not be stored redundantly and multiple arrays are not needed. FIG. 7 shows a block diagram of an exemplary embodiment where actual retrieval of associated data is not required.

The system 610 may comprise an input sensor 612 which provides input data on a data bus 614, an associative memory 616 as disclosed herein, an ordinary memory 618 which records a table of locations where the input data has been stored in the memory system 616, and a processor element 620. Input data is transmitted on the data bus 614 from the input sensor 612 to the associative memory 616 to derive the location in ordinary memory 618 (without retrieval of associated data from associative memory). The associative memory 616 responds by transmitting to the processor element 620, on the data bus 614, a value indicating a location where the input data has been found. The processor element 620, which may comprise a microprocessor of any standard make, then recovers the data from the ordinary memory 618, using the location provided by the associative memory 616 as an index into the table of locations of the ordinary memory 618. Because only one block of associated information is stored in association with each associative key, there is no need to retrieve that data element from the associative memory 616, and thus there is no need to include multiple arrays in the associative memory 616.

As disclosed with reference to FIG. 3B, a data structure 210 comprises one or more data elements 212, followed by an end of structure mark 214 and preceded by a start of structure mark 218. The data elements 212, an end of structure mark 214, and a start of structure mark 218 are stored in the Z-mems 310 of one or more mnemonds 114. In a preferred embodiment, a memory address pointer 216 is stored in the A-mem 314 of the mnemond 114 which stores the end of structure mark 214 (or one or more mnemonds 114 following), and this memory address pointer 216 refers back to the beginning of the data structure 210 (i.e. a memory address pointer 216 to the start of structure mark 218 in each array 112 where this data structure 210 is stored).

As disclosed with reference to FIG. 6, part of a data structure 210, previously stored in memory, can be used to reference other parts of the same data structure 210 in an associative manner. Thus for example, if multiple data structures 210 representing spoken lines from Shakespearean plays were stored in memory, one could use the first half (or any other part) of any line as a cue structure 410 and recover enough information to retrieve the entire data structure 210.

FIG. 6 shows the method of associating new data with an associative key. It is often desirable to associate data structures 210 with each other in a more flexible manner, thus making an association which it is possible to add to at another time. In a preferred embodiment of the invention, one or more memory address pointers 216 will also be stored in the A-mem 314 of the mnemond 114 which stores the start of structure mark 218. These memory address pointers 216 point to other data structures 210 (e.g. 210b) which are associated with the data structure 210 (e.g. 210a) they are stored as a part of. Thus for example, when recovering the memory address pointer 216 of a data structure 210 which represents a spoken line from a Shakespearean play, one might also be able to recover (if an appropriate associative memory address pointer 216 has been stored therein) a data structure 210 which represents commentary on that line or information about its meaning.

FIG. 8 shows the structure of a preferred embodiment of a memory address pointer 216. Because there may be many mnemonds 114 and thus many possible addresses to distinguish, it is generally impractical to allocate one A-bit 316 of an A-mem 314 per possible address. Rather than this one bit storage code, memory address pointers 216 are stored in a three (or more) bit storage code which compacts the number of A-bits 316 required per A-mem 314 greatly, but which still allows storage of multiple memory address pointers 216 in a single A-mem 314 without losing the ability to recover each individual memory address pointer 216 at a later time.

Each memory address pointer 216 comprises a set of three (or more) indicator bits 802 which are set to a logic "1" in a register 804 whose bits 806 are generally set to a logic "0". It will be clear to one of ordinary skill in the art that this situation could be reversed, and that a memory address pointer 16 could comprise indicator bits 802 set to a logic "0" in a register 804 whose bits 806 are generally set to a logic "1", or could comprise indicator pairs of bits or other recognizable indicator patterns of bits. The offset from each indicator bit 802 to the next indicator bit 802 determines a numeric value 808, which in a preferred embodiment is simply the difference between bit positions of the indicator bits. These numeric values 808 are combined in a predetermined manner to comprise a combined numeric address 810.

Thus, where there are exactly three indicator bits 802, there are two numeric values 808 which are determined from the indicator bits 802. In a preferred embodiment these two numeric values 808 are combined linearly, thus:

(combined numeric address 810)=1000 * (first numeric value 808) +1 * (second numeric value 808)

It will be clear to one of ordinary skill in the art that other linear combinations of the numeric values 808 could be chosen, that more than three indicator bits 802 and thus more than two numeric values 808 could be used, and that some numeric values 808 could be ignored (i.e. their contribution would be zero) when calculating the combined numeric address 810.

In a preferred embodiment, more than three indicator bits 802 may be used, but only the first three count towards determining a combined numeric address 810. This allows numeric values 808 to be combined with a memory address pointer 216 which are useful informational tags when using that memory address pointer 216 to retrieve a data structure 210 that it refers to. For example, in a preferred embodiment, one or more numeric values 808 may be used to represent the "quality" of the associative link, and one or more numeric values 808 may be used to represent the "abstraction level" of the associative link.

It will be clear to one of ordinary skill in the art that, after storage of more than one memory address pointers 216 in a given mnemond 114, there will be some ambiguity introduced by the existence of combinations of indicator bits 802 which are not attributable to any memory address pointer 216 originally stored in that A-mem 314. So that it is possible to recover each individual memory address pointer 216 from the A-mem 314 in which it is stored at a later time, it is desirable to introduce some differences between the storage of the same memory address pointer 216 in differing arrays 112, and to introduce some differences between the storage of differing memory address pointers 126 in the same mnemond 114. These differences can then be used to recover the individual memory address pointers 216 which were stored, much as the present invention is able to recover the individual data elements 212 which were stored in each mnemond 114 and data structures 210 which were stored in each bank 110, due to the differences between the storage of the same data structure 210 in differing arrays 112.

The present invention introduces these differences by storing multiple memory address pointers 216, with consequent multiple different indicator bits 802, at differing offsets from the beginning offset of the original memory address pointer 216 stored in that A-mem 314. An initial offset 812, the offset which the first indicator bit 802 has from the end of the register 804, is chosen which differs for representation of the same memory address pointer 216 stored in differing arrays 112, and which differs for representations of differing memory address pointers 216 stored in the same mnemond 114. In a preferred embodiment, this may be achieved by use of a formula substantially as shown:

$$\text{(initial offset 812)} = k0 + k1 * \text{(array 112 number)} + k2 * \text{(memory address pointer 216 number)}$$

Thus for example, if K0=1, K1=2, and K2=3, the first memory address pointer 216 would be stored at an initial offset 812 of six in the first array 112, eight in the second array 112, and ten in the third array; the second memory address pointer 216 would be stored at an initial offset 812 of nine in the first array 112, eleven in the second 112, and thirteen in the third array.

It will be clear to one of ordinary skills in the art how these differing offsets allow recovery of the originally stored memory address point 216. When reading a memory address pointer 216 from a set of A-means 314, a memory system controller must offset the A-bits 316 by the opposite of the amount they were originally offset when stored in that A-mem 314.

Figure 9A:
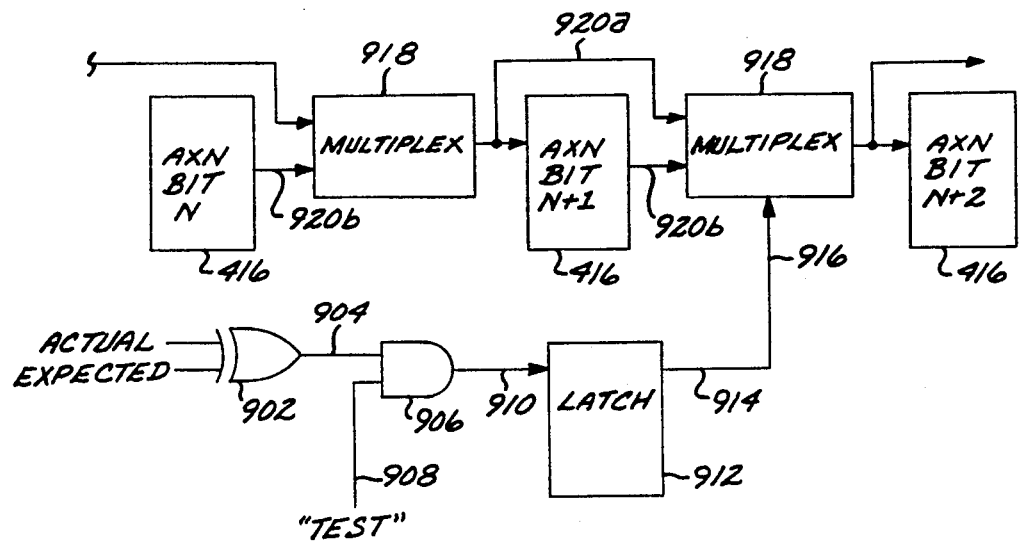
FIG. 9A shows the structure of a fault-tolerant variant embodiment of the AXN-register.

FIG. 9A shows the structure of a fault-tolerant variant embodiment of the AXN-register 414. Because it may occur that one or more mnemonds 114 may fail during operation or exhibit errors due to mistakes in manufacture, it is desirable to provide a mechanism for removing the failed mnemond 114 from the array 112 of which it is a part. Accordingly, test and disabling circuitry is provided. XOR gate 902 compares the actual output from the mnemond 114 with its expected output. The output of XOR gate 902, on line 904, is propagated through AND gate 906 when a "TEST" signal on line 908 is set to a logic "1". The output of AND gate 906, on line 910, is preserved via a latch 912 and propagated to modified circuitry for each AXN-bit 416, to disable that AXN-bit 416 if a fault is detected for its corresponding mnemond 114.

The disable signal, on line 914, is propagated to the select input 916 of a multiplexer 918, and determined which of the two input bits 920a-b are propagated by the multiplexer 918 to the next AXN-bit 416. Input to the multiplexer 918 are the AXN-bit 416 corresponding to this particular mnemond 114 and the AXN-bit 416 immediately preceding. Thus, when the disable signal is set to a logic "1", the AXN-bit 416 corresponding to the preceding mnemond 114 will be propagated to the AXN-bit 416 for the following mnemond 114, without interference by the mnemond 114 which is disabled.

Figure 9B:
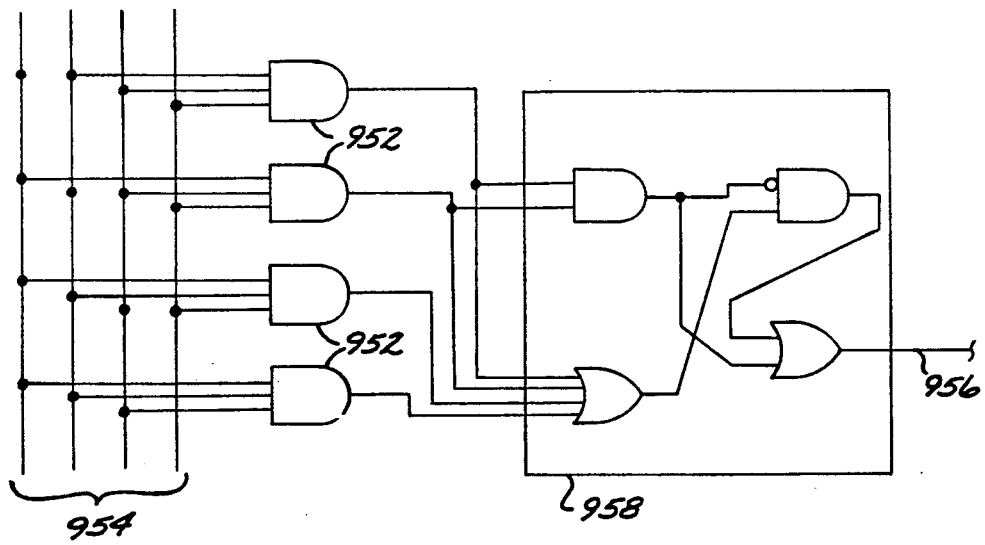
FIG. 9B shows the structure of a fault-tolerant variant of the array match circuitry.

FIG. 9B shows the structure of a fault-tolerant variant of the array match circuitry. Because entire arrays 112 are also subject to failure, it is desirable to provide circuitry which allows a band 110 to declare a bank match, even when one of its arrays 112 has failed. Accordingly, AND gates 952, one per array 112 in the bank 110, each receives inputs on lines 954 from each array 112, indicating for each array 112 if that array 112 has declared an array match. The output of all AND gates 952 are propagated to circuitry 958 which, as is well known in the art, will indicate a bank match signal on line 956 if and only if all-but-one of the arrays 112 have declared array matches.

Figure 10:
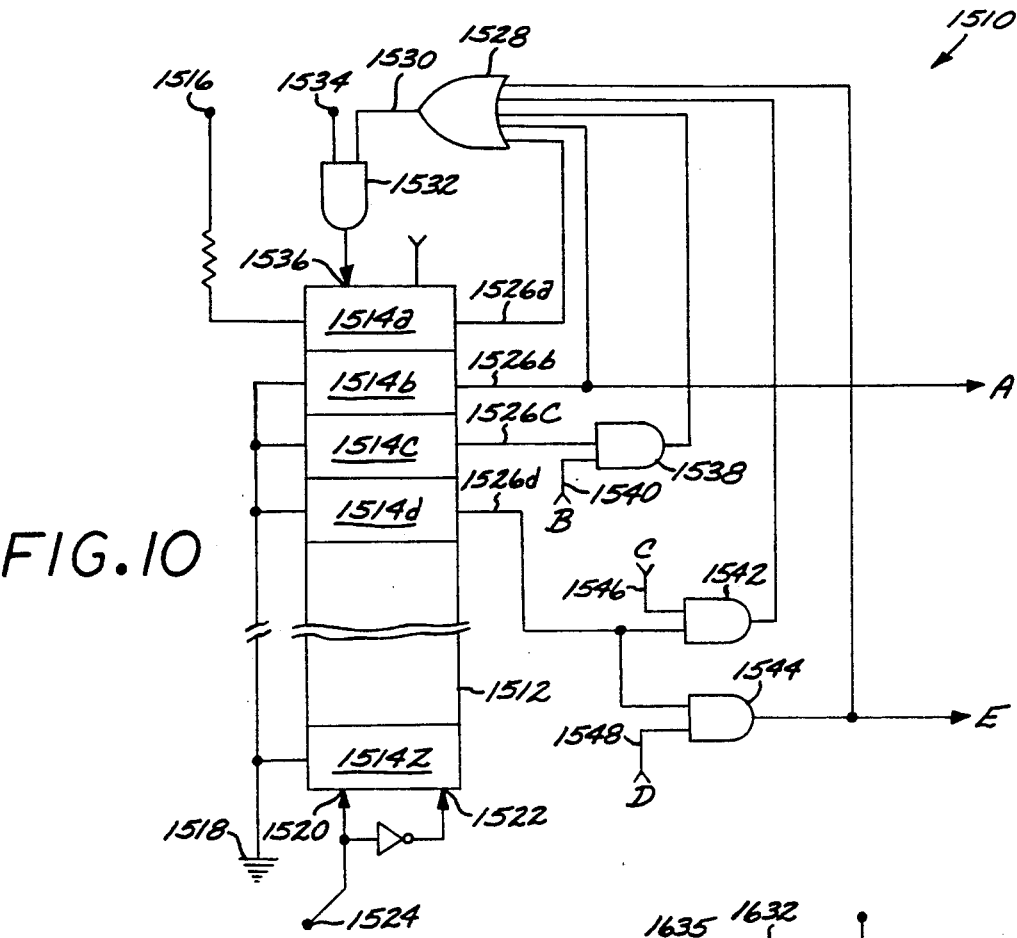
FIG. 10 is a circuit diagram of a program shift register.

FIG. 10 is a circuit diagram of a program shift register ("PSR") 1510. This circuit is commonly used throughout the present invention to implement certain program functions, although it will be clear to one skilled in the art that the use of a PSR 1510 for any given function is not required, and may be replaced by a microprocessor operating under the control of suitable software, by a programmed logic array, or by other similar structures. A PSR 1510 is usually preferred because they are inexpensive to construct, particularly because many of them may operate in parallel.

A parallel/serial shift register 1512, which may comprise one or more standard 7496-type shift registers in series, is arranged with a parallel input for its first bit 1514a electrically connected to a voltage source 1516 (which indicates a logic "1") and with parallel inputs for each of its other bits 1514b-z commonly electrically connected to ground 1518 (which indicates a logic "0"). A parallel load input 1520 and a clear input 1522 for the shift register 1512 are electrically connected to an input trigger line 1524. Thus, when a logic "1" is transmitted on the input trigger line 1524, the shift register 1512 is cleared and parallel loaded with a logic "1" bit in its first bit 1514a and logic "0" bits in all its other bits 1514b-z.

Each bit 1514 (e.g. 1514a) has its value transmitted on a bit output line 1526 (e.g. 1526a) directly to intermediate circuitry and ultimately to the input of an OR gate 1528 (called a "program advance OR" or a "PAOR"). The output of this OR gate is transmitted on line 1530 to the input of an AND gate 1532. A clock signal on line 1534 is also input to the AND gate 1532, and the output of the AND gate 1532 is transmitted to a clock input 1536 for the shift register 1512. Thus, when the logic "1" which was initially loaded into the first bit 1514a appears on a bit output line 1526 (e.g. 1526a), it causes line 1530 to be set to a logic "1" and thus causes the shift register 1512 to be enabled for shifting when the clock signal on line 1534 is triggered.

A PSR 1510 is called a "program" shift register 1510 because bits 1514 may be manipulated in several ways by intermediate circuitry, as mentioned above, before their values are transmitted to the OR gate 1528. For example, they may also have their values transmitted on a bit output line 1526 to trigger the initiation of another PSR 1510 (i.e., a "fork" process control operation, as is well-known in the art). This is indicated in the figures by naming a signal which the bit 1514 triggers, e.g. "A". In a preferred embodiment, the relevant bit output line 1526 may be electrically connected to the input trigger line 1524 of another PSR 1510.

They may also have their values manipulated by logic circuitry, so as to await one or more other signals before the PSR 1510 is advanced (i.e., a "joint" process control operation, as is well-known in the art). This is indicated in the figures by a plus signal followed by the signal name which is awaited, e.g. "+B". For example, an AND gate 1538 may cause the PSR 1510 to await the "B" signal on line 1540 before it is advanced by the clock signal on line 1534. For another example, a pair of AND gates 1542 and 1544 may similarly cause the PSR 1510 to await either the "C" signal on line 1546 or the "D" signal on line 1548 before it is advanced by the clock signal on line 1534. Other similar intermediate circuitry for controlling the program advance of a PSR 1510 will be clear to those of ordinary skill in the art.

Figure 11:
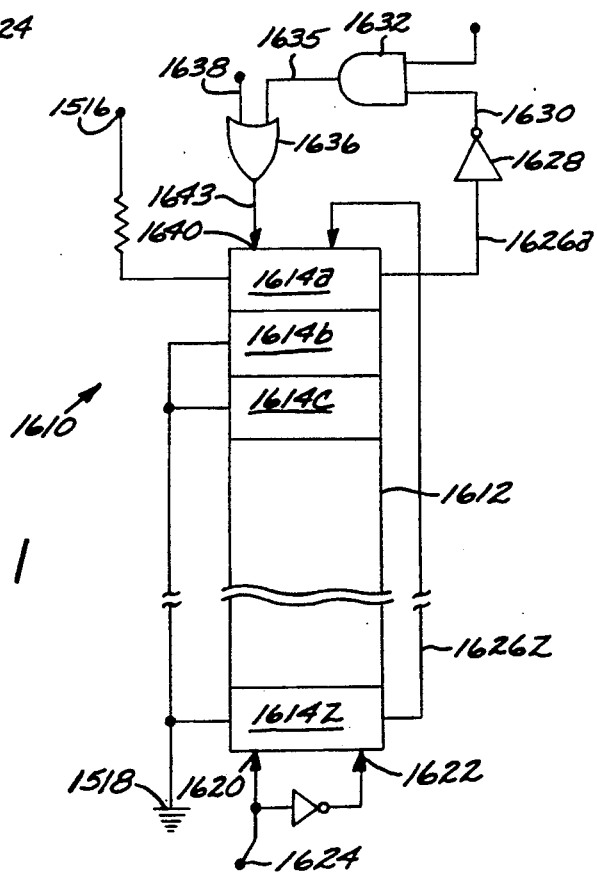
FIG. 11 is a circuit diagram of a cycle counter register.

FIG. 11 is a circuit diagram of a cycle counter register ("CCR") 1610. Like the PSR 1510, this circuit is also commonly used throughout a preferred embodiment of the present invention to implement certain program functions, although bit will be clear to one skilled in the ar that its use is not required if it is replaced by a microprocessor operating under the control of suitable software, by a programmed logic array, or by other similar structures. Like the PSR 1510, a CCR 1610 is often preferred because they are inexpensive to construct, and because many of them may operate in parallel.

A parallel/serial shift register 1612, which may comprise one or more standard 7496-type shift registers connected in series, is arranged with a parallel input for its first bit 1614$a$ electrically connected to a voltage source 1516 (which indicates a logic "1"), and with parallel input for each of its other bits 1614$b$-$z$ similarly electrically connected to ground 1518 (which indicates a logic "0"). A parallel load input 1620 and a clear input 1622 for the shift register 1612 are electrically connected to an input trigger line 1624. Thus, like the PSR 1510, when a logic "1" is transmitted on the input line 1624, the shift register 1612 is cleared and parallel loaded with a logic "1" bit in its first bit 1614$a$ and logic "0" bits in all its other bits 1614$b$-$z$.

The first bit 1614$a$ has its value transmitted on a bit output line 1626, inverted by an inverter 1628, and then transmitted on a line 1630 to the input of an AND gate 1632. A clock signal on line 1634 is also input to the AND gate 1632, and the output of the AND gate 1632 is transmitted to an OR gate 1636. A count trigger signal on line 1638 is also input to the OR gate 1636, and the output of the OR gate 1636 is transmitted to a clock input 1640 for the shift register 1612. Thus, when the logic "1" which was initially loaded into the first bit 1614$a$ appears on a bit output line 1626, it causes line 1630 to be set to a logic "0" and thus causes the shift register 1612 to be disabled for shifting when the clock signal on line 1634 is triggered. But when the trigger signal on line 1638 is set to logic "1", the CCR 1610 shifts repeatedly, once per trigger of the clock signal on line 1634, until the logic "1" is returned to the first bit 1614$a$ via bit output line 1626$z$ via AND gate 1642 and line 1643.

Referring to FIG. 2, a block diagram of a mnemond 114, also shows the registers which are used to implement the mnemond 114 procedures. Each mnemond 114 may also comprise an A-mem 314, which itself comprises a register with a plurality of A-bits 316. Like the Z-mem 310, which is used for storing data, the A-mem 314 is used for storing address pointers to data, Each mnemond 114 records address pointers to data in its A-mem 314 to make associations between cue structures (e.g., test strings which serve as keys to locate information) and data structures. Each data structure contains a special end of structure mark 214 which indicates the end of the data structure 210. In a preferred embodiment, the mnemond 114 which records the end of structure mark 214 also records in its A-mem 314 an address pointer to the beginning of the data structure 210. This allows the entire data structure 210 to be located when only a part of the data structure 210 is matched by a cue structure 410.

Each mnemond 114 may also record address pointers to data in its A-mem 314 at the beginning of each data structure 210, to represent an association between that data structure 10 and other associated data. The A-mem 314 contains the address pointer to the associated data, plus other property information about the associated data, such as a value to indicate the level of abstraction at which the association is made.

Each mnemond 114 also comprises a match-ctr 318, which itself comprises a register with a plurality of match-bits 320. The match-ctr 318 is used to record the number of cue "data points" for which a match has been detected. Where a serial data structure 210 (e.g. representing a spoken or written sentence) is cued, normally each mnemond 114 will record exactly one data element 212, but where a non-serial data structure 210 (e.g. representing a picture image) is cued, each mnemond 114 may record a plurality of data elements 212 at once. Each of these data elements 212, when cued for a single mnemond 114, is called a "data point".

The Z-mem 310, A-mem 314, and match-ctr 318 for each mnemond 114 are respectively associated with registers comprising the array 112 which contains that mnemond 114, and with registers comprising the bank 110 which contains that array 112. These associated registers and their connections with the registers which comprise each mnemond 114 are also shown in FIG. 2.

Z-mems 310 are all associated with a single Q-buf 322 per bank 110, itself comprising a plurality of Q-bits 344 in a structure identical to a Z-mem 310, and a single Z-CCR 324 per bank 110, itself comprising a CCR 1610 equal in length to a Z-mem 310. The Q-buf 322 records one or more data elements 212 which the bank 110 has buffered for input/output operations. The Z-CCR 324 is a counting register which enables the bank 110 to direct a complete cycle of reading/readout of the Z-mem 310 and of the Q-buf 322.

In a preferred embodiment, associated with the A-mem 314 is an A-buf 326, itself comprising a structure identical to a A-mem 314, and an A-CCR 328, itself comprising a CCR 1610 equal in length to an A-mem 314. Like the Q-buf 322, the A-but 326 records one or more address pointers which the bank 110 has buffered for storage or retrieval operations. Like the Z-CCR 324, the A-CCR 328 is a counting register which enables the bank 110 to direct a complete cycle of reading/readout of the A-mem 314 and of the A-buf 326.

Associated with the match-ctr 318 is a Q-ctr 330, itself comprising a structure identical to a match-ctr 318, ana d match-CCR 332, itself comprising a CCR 1610 equal in length to a match-ctr 318. The Q-ctr 330 counts the number of data points which the bank 110 has presented to its mnemonds 114 for cueing. Like the Z-CCR 324, the match-CCR 332 is a counting register which enables the bank 110 to direct a complete cycle of readin/readout of the match-ctr 318 and of the Q-ctr 330.

Each mnemond 114 also comprises a FIRST register 334, which itself comprises a latch with a single bit value 336. The single bit value 336 of the FIRST register 334 is a flag bit indicating that the mnemond 114 is responding to the first cue element 412$a$ of a cue structure 410. The flag bit of the FIRST register 334 can be set when the first cue element 412$a$ is being presented. It will be cleared automatically when later cue elements are presented.

Each mnemond 114 also comprises a MATCH register 338, which itself comprises a latch with a single bit value 340. The single bit value 340 of the MATCH register 338 is a flag bit indicating that the mnemond 114 has declared a "mnemond match" (i.e. a match between a data element 212 stored in the Zmem 310 for this mnemond 114 and the cue element 412 which was presented). The MATCH register 338 must be reset for each mnemond 114 for each cue element 412 which is presented to that mnemond 114.

Figure 4B:
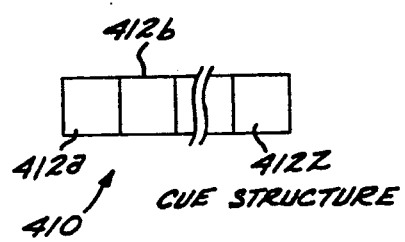
FIG. 4B shows a cue structure associated with that method.

As disclosed with reference to FIG. 4B, each array 112 comprises an AXN-register 414, which itself comprises a shift register with one AXN-bit 416 per mnemond 114 in that array 112. Each mnemond 114 comprises an AXN-latch 342 which records the value of the AXN-bit 416 associated with that mnemond 114 while the AXN-register 414 is shifted. As disclosed with reference to FIG. 4B, the AXN-register 414 is shifted right one bit after each cue element 412 is presented by the bank 110 to its mnemonds 114 (during a cueing operation), after each data element 212 is presented by the bank 110 to its mnemonds 114 (during a storing operation), and after each data element 212 is retrieved by the bank 110 from its mnemonds 114 (during a retrieval operation).

Each bank 110 also comprises a plurality of PSRs 1510 for controlling the operation of the bank 110 registers (Q-buf 322, Z-CCR 324, A-buf 326, A-CCR 328, Q-ctr 330, and match-CCR 332), array 112 registers (AXN-register 414), and mnemond 114 registers (Z-mem 310, A-mem 314, match-ctr 318, FIRST register 334, MATCH register 338, and AXN-latch 342). In FIG. 2, each PSR 1510 is labelled with program codes as disclosed with reference to FIG. 10, thus it should be clear to one of ordinary skill in the art how the store, locate, and retrieve operations are implemented.

Each CCR 1610 (Z-CCR 324, A-CCR 328, and match-CCR 332) has associated with it a "start" signal ("B" on line 324a, "K" on line 328a, and "A" on line 332a respectively) and an "end" signal ("X" on line 324b, "Z" on line 328b, and "W" on line 332b respectively). A single "reset" signal on line 324c suffices to reset all three CCRs 1510 simultaneously. Because the connection of clock inputs is disclosed in detail with respect to FIGS. 10-11, clock inputs are generally not shown in FIG. 2 and may be presumed to be tied to a common system clock signal except where otherwise specified.

Associated with the Z-CCR 324 are the Z-mem 310 and Q-buf 322 registers; these latter two registers are clocked by the same signal on line 324a as the Z-CCR 324. Thus, when a PSR 1510 triggers the signal on line 324a, the Z-CCR 324 is made to count its entire cycle, while the Z-mem 310 and the Q-buf 322 count their entire cycles simultaneously. This allows individual Z-bits 312 in the Z-mem 310 and their corresponding Q-bits 344 in the Q-buff 322 to be directly compared and directly transferred between the two registers.

In like manner, associated with the A-CCR 328 are the A-mem 314 and the A-buf 326 registers, and associated with the match-CCR 332 are the match-ctr 318 and Q-ctr 330 registers. The A-CCR 328, A-mem 314, and A-buf 326 registers are all triggered by a signal on a single line 328a. The match-CCR 332 is triggered by a signal on a line 332a; this signal is propagated through OR gate 318a to trigger the match-ctr 318 and through OR gate 330a to trigger the Q-ctr 330.

OR gates 318a and 330a serve to allow other signals to also trigger the match-ctr 318 and the Q-ctr 330. The Q-ctr 330 is also triggered by Q-bits 344 which are set to a logic "1", thus each data point stored in the Q-buf 322 and presented to the mnemond 114 for cueing causes the Q-ctr 330 to advance one position (since it is a CCR 1610). The match-ctr 318, in contrast, is triggered by the output of AND gate 318b, which compares Q-bits 334 with their corresponding Z-bits 312. Thus the match-crt 318 will advance only when the cured data point from the Q-buf 322 matches a stored data point from a Z-mem 310. When the match-ctr 318 and the Q-ctr 330 are later cycled by the signal to the match-CCR 332 on line 332a, AND gate 338a will output a logic "1" if and only if an equal number of data points were cued and were detected.

The FIRST register 334 is also triggered by the signal to Z-CCR 324 on line 324a, thus it is initiated with a logic "1" when the first cue element 412a is presented and cycles to a logic "0" for all succeeding cue elements 412. The FIRST register 334 and the MATCH register 338 supply inputs to AND gate 348a, while the MATCH register 338 and the AXN-latch 342 supply inputs to AND gate 348b; AND gates 348a-b supply inputs to OR gate 348c, which supplies the parallel input to the AXN-bit 416 of the AXN-register 414 associated with that mnemond 114. The input of the AXN-latch 342 is supplied by the AXN-bit 416.

Thus, the AXN-latch 342 for each mnemond 114 stores the previous AXN-bit 416 from the AXN-register 414 when the AXN-register 414 is shifted and cleared, and supplies the next AXN-bit 416 (after propagation through gates 348a-c) when the AXN-register 414 is reloaded. The gates 348a-c provide that each AXN-bit 416 is set to a logic "1" in only two cases: (1) when the first cue element 412a has been matched by this mnemond 114, or (2) when the preceding mnemond 114 for this mnemond 114 has had its AXN-bit 416 set to a logic "1", and a cue element 412 other than the first cue element 412a has been matched by this mnemond 114.

Figure 12:
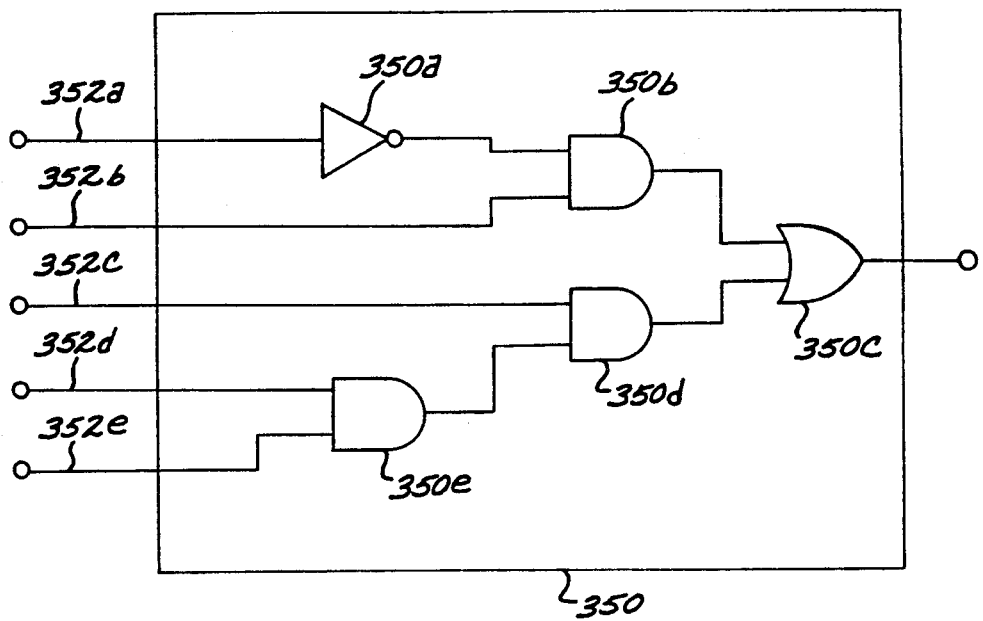
FIG. 12 is a block diagram of a Z-data mux.

The Z-mem 310 has its data input port 310a supplied with data from a Z-data mux 350. The Z-data mux 350 is further disclosed with respect to FIG. 12; it is shown there to comprise five gates 350a-e responsive to five input signals on lines 352a-e. The nature and use of the five input signal will be clear to one of ordinary skill in the art from an examination of the circuit shown in FIG. 12.

A CLEAR signal on line 352a may be set by the bank 110 to clear Z-bits 312, in a particular Z-mem 310 or in all Z-mems 310, to a logic "0" through the action of inverter 350a. If the CLEAR signal is not set, the old Z-bit 312 is input on line 352b via AND gate 350b (from the output of the Z-mem 310) and recycled back via OR gate 350c into the Z-mem 310. Additionally, a new data element 212 may be directed to be stored in the Z-mem 310. A STORE-ENABLE signal on line 352c may be set by the bank 110 to enable storing of a new Z-bit 312 via AND gate 350d and OR gate 350c. If the STORE-ENABLE signal is set, a new Z-bit 312 on line 352d (from the output of the Q-buf 322) is stored in each mnemond 114 whose AXN-bit 416, input on line 352e, has been set to a logic "1" via AND 350e, AND 3520d and OR 350c.

The A-mem 314 has its data input port 314a similarly supplied with data from an A-data mux 354. The A-data mux 354 is almost identical in structure to the Z-data mux 350; differing only in that it is responsive to an old A-bit 316 rather than an old Z-bit 312 (from the output of the A-mem 314) and responsive to a new A-bit 316 rather than a new Z-bit 312 (from the output of the A-buf 326 as disclosed above). In a preferred embodiment of the invention, the CLEAR signal and the STORE-ENABLE signal for the Z-mem 310 may be transmitted on separate lines from similar signals for the A-mem 314.

Each operation previously disclosed is performed by one or more PSRs 1510 operating with the bank 110, array 112, and mnemond 114 structure shown in FIG. 2.

Each of the store, locate, and retrieve operations has one or more PSRs 1510 which perform that operation. Several offer primitive operations are provided to allow a memory system controller more flexibly to manipulate the memory system disclosed herein.

A "READ ADDRESS" operation is provided to read a memory address pointer 216 from an A-mem 314, when provided with a memory address pointer 216 to the A-mem 314 to be read from. The "K" signal on line 328a is triggered and the "Z" signal on line 328b is awaited, causing the A-CCR 328 to count its entire cycle, and thus causing A-bits 316 in the A-mem 314 to be retrieved. These A-bits 316 are ANDed using bank 110 AND gate 354 to retrieve a memory address pointer 216.

A "STORE ADDRESS" operation is provided to store a memory address pointer 216 into an A-mem 314, when provided with a memory address pointer 216 to the A-mem 314 to be stored into. The "K" signal on line 328a is triggered and the "Z" signal on line 328b is awaited, while the "STORE ENABLE" signal on line 352c is enabled, causing the A-CCR 328 to count its entire cycle, and thus causing A-bits 316 in the A-mem 314 to be altered to add a new memory address pointer 216.

A "RETRIEVE DATA STRUCTURE" operation is provided to retrieve information from one or more Z-mems 310, when provided with a memory address pointer 216 to the Z-mems 310 to be read from. Given a memory address pointer 216, the memory system controller determines which particular mnemonds 114 in the bank 110 store the beginning of the data structure 210 to be retrieved. Retrieval follows the steps disclosed with reference to FIG. 5.

The "reset" signal on line 324c is triggered, which resets the Z-CCR 324, the A-CCR 328, and the match-CCR 332 simultaneously. The "B" signal on line 324a is then triggered, which starts the Z-CCR 324 counting for one Z-mem 310 cycle. The Z-CCR 324 cycles the Z-bits 312 in the Z-mem 310, causing them to be read out one by one for each mnemond 114 in the bank simultaneously. Each Z-bit 312 is ANDed with the corresponding AXN-bit 416 for that mnemond 114 by AND gate 356a, and only those Z-bits 312 for mnemonds whose AXN-bits 416 are set to a logic "1" are propagated to the output of AND gate 356. These Z-bits 312 are ANDed together by AND gate 356b to produce an output Q-bit 344, which is stored in the Q-buf 322 via mux 357 for readout by a memory system controller. The AXN-register 414 is then advanced one bit by triggering signal "R" on line 418a to shift the AXN-register 414 right.

The output data element 212 stored in the Q-buf 322 is also compared with an end of structure mark 214. If no end of structure mark 214 is detected, the operation for reading a data element 212 is triggered again, causing the next data element 212 to be retrieved from the next set of mnemonds 114. If an end of structure mark 214 is detected, the READ ADDRESS operation disclosed above is triggered, causing the memory address pointer 216 from the A-mem 314 then referenced by the AXN-register 414 to be retrieved and stored in the A-buf 326.

A "LOCATE CUED DATA STRUCTURE" operation is provided to locate a specified cue structure 410 in memory, when provided with a cue structure 410 to locate. Locating the cue structure 410 follows the steps disclosed with reference to FIG. 4B. First, the "H" signal on line 338b is triggered, which clears the MATCH register 338.

The "E" and "F" signals on lines 330b and 318c respectively are then triggered, simultaneously clearing the match-ctr 318 and Q-ctr 330 registers to indicate zero cue data points. The "B" signal on line 324a is then triggered and the "X" signal on line 324b is awaited, causing the Z-CCR 324 to count its entire cycle, and thus causing the Z-mem 310 and Q-buf 322 to be compared. Note that this causes the Z-ctr 330 to be updated to indicate the number of cue data points in the cue element 412 presented, and causes the match-ctr 318 to be updated to indicate the number of cue data points which were matched. The "A" signal on line 332a is then triggered and the "W" signal on line 332b is awaited, causing the match-CCR 332 to count its entire cycle, and thus causing the match-ctr 318 and Q-ctr 330 to be compared. This completes the comparison of a single cue element 412.

The "R" signal on line 418a is then triggered to advance the AXN-register 414 one bit, followed by triggering the "P" signal on line 342a to enable the AXN-latch 342 and the "Q" signal on line 418b to reload the AXN-register 414 with the modified AXN-bits 416 (i.e. the AXN-bits 416 have been processed by gates 348a-c to yield only those AXN-bits 416 which continue to be associated with mnemonds 114 which have detected a match with the latest presented cue element 412). If there are no more cue elements 412 at this point the cueing operation in complete, and no more steps are taken. The located data structure 210 may then be retrieved with the "RETRIEVE DATA STRUCTURE" operation, disclosed above. If there are more cue elements 412, the cue operation is triggered again, causing the next cue element 412 to be presented to the next set of mnemonds 114.

A "STORE DATA STRUCTURE" operation is provided to store a specific data structure 210 in memory. Storing the data structure 210 follows the steps disclosed with reference to FIG. 3. First, as disclosed with reference to FIG. 4B, the data structure 210 to be stored in memory is first presented to the memory as a cue structure 410, complete with start of structure mark 218 and an end of structure mark 214, to determine if that data structure 210 has already been stored somewhere in memory. If that data structure 210 is detected as already present in memory, no store operation is performed.

As disclosed with reference to FIG. 3, a memory system controller must first select a single mnemond 114 in each array 112 into which the first data element 212a of the data structure 210 is to be stored. After this sub-operation is complete, the AXN-register 414 for each array 112 will comprise a set of AXN-bits 416 which are set to a logic "1" to indicate those mnemonds 114 where the first data element 212a is to be stored, and exactly one AXN-bit 416 will be set per array 112.

A single data element 212 is then stored. The "B" signal on line 324a is triggered and the "X" signal on line 324b is awaited, while the "STORE ENABLE" signal on line 352c is enabled, causing the Z-CCR 324 to count its entire cycle, and thus causing Z-bits 312 in the Z-mem 310 to be altered to add a new data element 212. If there are more data elements 212 to be stored, the "R" signal on line 418a is triggered to shift the AXN-register 414 one bit, and the store operation is triggered again, causing the next data element 212 to be stored.

It there are no more data elements 212 to be stored, a memory address pointer 216 is stored, in a preferred embodiment, in each A-mem 314 in array 112 then pointed to by the AXN-register 414. As disclosed with reference to FIG. 5, this memory address pointer 216 points back to the starting location of the data structure 210. The "K" signal on line 328a is triggered and the "Z" signal on line 328b is awaited, while the "STORE ENABLE" signal on line 352c is enabled, causing the A-CCR 328 to count its entire cycle, and thus causing A-bits 316 in the A-mem 314 to be altered to add a new memory address pointer 216. The storage operation is then complete, and no more steps are taken.

Figure 13:
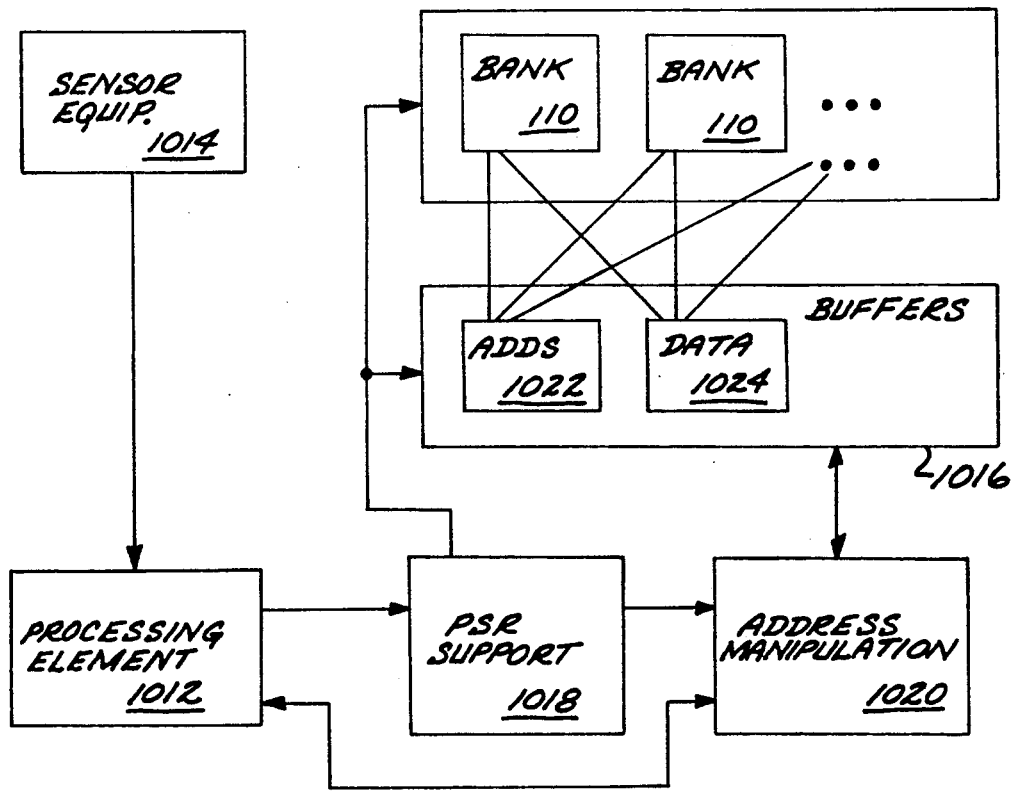
FIG. 13 is a block diagram of a control system for use with a system of banks.

FIG. 13 is a block diagram of a control system 1010 for use with a system of banks 110. At least one bank 110, comprising arrays 112 and mnemonds 114 as disclosed with reference to FIG. 1, is operated under the control of a processing element 1012, assisted by sensor equipment 1014, buffers and interface registers 1016, PSR support hardware 1018, and address manipulation hardware 1020.

The processing element 1012 may comprise a commonly available general purpose processor, e.g. a microprocessor chip, operating with working memory and operating under software control, as is well-known in the art. It will be clear to one of ordinary skill in the art that method steps disclosed herein may be generally implemented by one or more PSRs 1510 in the PSR support hardware 1018 as disclosed with reference to FIG. 10, or by the processing element 1012 operating under software control, as is well-known in the art. For any particular set of method steps, it would be clear to one of ordinary skill in the art how to modify a PSR 1510 (disclosed with reference to FIG. 10) to perform those method steps, and it would also be clear to one of ordinary skill in the art how to use commonly available processing elements to carry out those method steps under software control.

For example, the sensor equipment 1014 may comprise visual and/or voice sensory equipment for detecting visual and/or voice information in the ambient environment and encoding that visual and/or voice information for processing and storage in the memory system of the present invention. Other and further information on a sensor system which is particularly suited for use with the present invention may be found in a copending application, "VISUAL/VOICE INPUT RECOGNITION SENSOR", Ser. No. 07/001,161 now U.S. Pat. No. 4,891,602, and hereby incorporated by reference as if fully set forth herein.

The buffers and interface registers 1016 may comprise an address register 1022 for storing memory address pointers 216 and a data register 1024 for storing data structures 210. The address register 1022 is used to store values into and retrieve values from the A-buf 326, and the data register 1024 is used to store values into and retrieve values from the Q-buf 322 (one data item 212 at a time, of course).

When a memory address pointer 216 is retrieved with the "READ ADDRESS" operation, it is stored in the address register 1022. When a data structure 210 is retrieved with the "RETRIEVE DATA STRUCTURE" operation, it is stored in the data register 1024. When the "LOCATE CUED DATA STRUCTURE" operation is initiated, the cue structure 410 to be located is stored in the data register 1024, and the memory address pointer 216 which is retrieved is stored in the address register 1022. When the "STORE DATA STRUCTURE" operation is initiated, the data structure 410 to be stored is stored in the data register 1024.

The PSR support hardware 1018 may comprise a plurality of PSRs 1510, as disclosed with reference to FIG. 10, for directing the operations of the bank 110 and the arrays 112 and mnemonds 114 which comprise the bank 110. Operations which are to be carried out simultaneously by each array 112 in the bank 110, or simultaneously by each mnemond 114 in the bank 110, are directed by at least one PSR 1510 in the PSR support hardware 1018, with its output signals as disclosed with reference to FIG. 10, are fanned out, as is well-known in the art, to control each such array 112, or each such mnemond 114, in the bank 110.

FIGS. 14A and 14B show block diagrams of address manipulation hardware 1020 for a control system 1010. Address values may be generated, retrieved from their stored representation in the bank 110, translated between multiple representations, and manipulated to trace and recover the associative relations of data structures 210 which are stored in the bank 110.

Address values (in address symbol format) may be generated by an address generator 1112. It records the most recently generated address symbol in a current address register 1114 and generates the "next" address symbol upon command from the processing element 1012. Address symbols are further disclosed with reference to FIG. 3.

Address values (in memory address pointer 216 format) may be retrieved from their stored representation in the bank 110 by an address demultiplexer 1116. It retrieves the representations of address values stored in a designated A-mem 314 of each array 112 of the bank 110, and extracts address values by comparison of the differences between these representations. The address demultiplexer 1116 is further disclosed with reference to FIG. 15A.

Address values are translated between multiple representations by an X/Y-to-Z address or data translator 1118 and a Z-to-X/Y address or data translator 1120. The X/Y-to-Z address or data translator 1118 converts address values from a (two dimensional) "X/Y" format, disclosed with reference to FIG. 8, to a (one dimensional) "Z" format, which is identical to the format in which data items 212 are stored in a Z-mem 310. The reverse operation is performed by the Z-to-X/Y address or data translator 1120. The X/Y-to-Z address or data translator 1118 and the Z-to-X/Y address or data translator 1120 are further disclosed with reference to FIGS. 15A and 15B respectively.

Address values (in Z-format) may be manipulated to trace and recover the associative relations of data structures 210 which are stored in the bank 110 by an address list associator 1122. The address list associator 1122, using an address value which has been retrieved from the bank 110 (i.e. retrieved by the address demultiplexer 1116 and translated by the X/Y-to-Z address or data translator 1118), traces all address values which are associated with the original address value by memory address pointers 216. Associated address values which are associated with the original address value by, e.g., links of a specified indirection depth, or of a specified quality level or abstraction level, may be specified, and these informational tags may be recovered. The address list associator 1122 is further disclosed with reference to FIG. 17.

FIG. 12A is a block diagram of an address extractor and demultiplexer 1116. The content of the A-mem 314 of the selected mnemond 114 for each array 112 is stored in a set of A-bufs 1210a-z (e.g. 1210i) and the memory address pointer 216 which is common to them is extracted. The address extractor and demultiplexer 1116 detects memory address pointers 216 which are common to all A-bufs 1210a-z, and extracts and records them for use by the control system 1010.

In a preferred embodiment, the address extractor and demultiplexer 1116 may operate by comparing each pair of A-bufs 1210a-z for common memory address pointers 216, using each possible bit offset so that memory address pointers 216 which are offset with respect to each other will still be detected. Each A-buf 1210a-z can then be examined for the presence of a detected common memory address pointer 216, so that only memory address pointers 216 which are present in all A-bufs 1210a-z are actually extracted. The address extractor and demultiplexer 1116 makes use of a set of A-bufs 1210 (e.g. 1210a-z), an A-buf CCR 1212, a first AXOND gate 1214, a first A-match 1216, a set of second AXOND gates 1218 (e.g. 1218c-z), and a set of second A-matches 1220 (e.g. 1220c-z).

Each A-buf 1210 (e.g. 1210i) records a copy of the contents of the selected A-mem 314 in the array 112 assigned to it. The A-buf CCR 1212, a CCR 1610 twice the length of each A-buf 1210, is used to "slide" A-buf 1210b past A-buf 1210a (i.e. compare the two A-bufs 1210 with each possible bit offset). A first AXOND gate 1214 responds when there is a common pattern (three or more identical bits, in a preferred embodiment) in the two A-bufs 1210, emits a pulse signal on line 1222a when this condition is detected, and records the common pattern in a first A-match 1216.

The contents of the first A-match 1216 is copied into each second A-match 1220c-z (one per A-buf 1210c-z, excluding the first two A-bufs 1210a-b). The A-buf CCR 1212 then "slides" each A-buf 1210c-z past its corresponding A-match 1220c-z. A set of second AXOND gates 1218c-z responds when the common pattern appears in the A-buf 1210c-z and its corresponding A-match 1220c-z, and emits a pulse signal on line 1222c-z when this condition is detected.

The pulse signals on lines 1222a and 1222c-z are recorded in a set of corresponding latches 1224a and 1224c-z. The outputs of these latches 1224a and 1224c-z are electrically connected to the inputs of an AND gate 1226, which outputs a logic "1" on line 1228 if its inputs are all logic "1". This output on line 1228, along with the contents of the first A-match 1216, may be transmitted to the control system 1010 upon command.

Figure 15B:
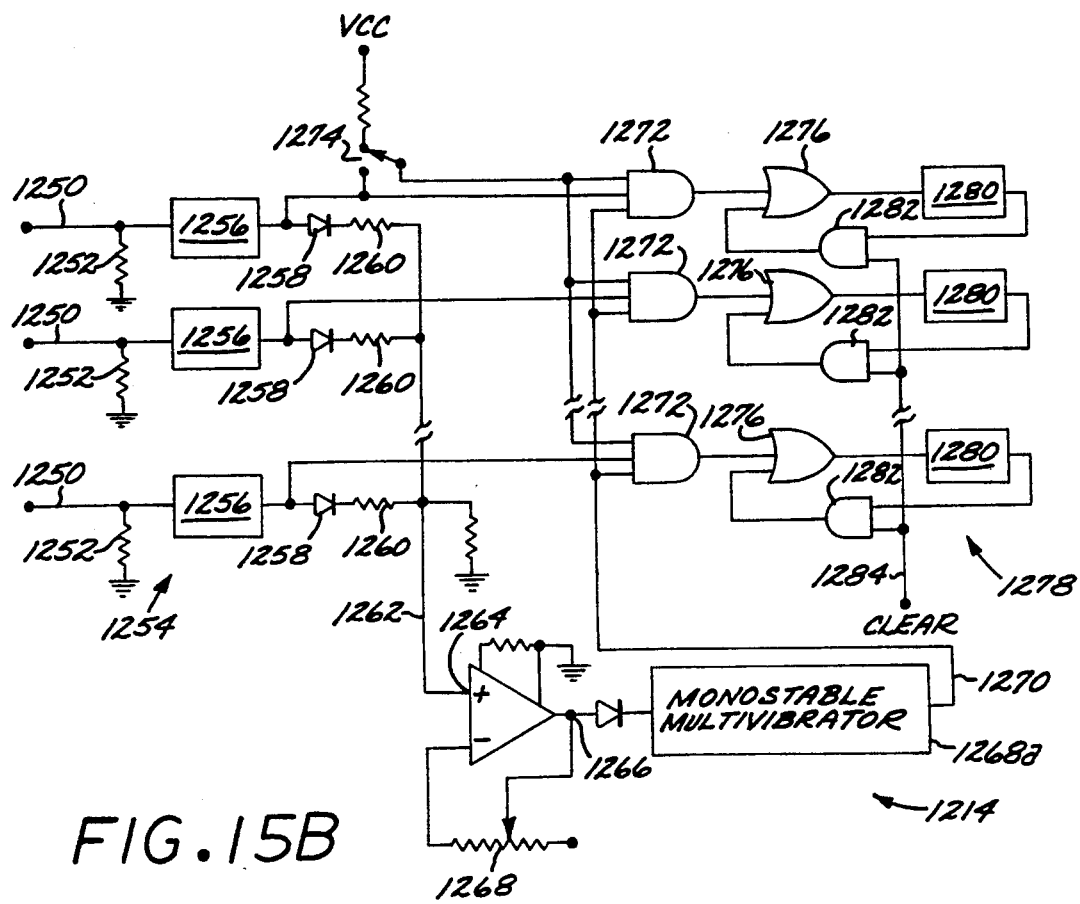
FIG. 15B is a block diagram of an AXOND gate.

FIG. 15B is a block diagram of an AXOND gate 1214. Operation of the first AXOND gate 1214 and the set of second AXOND gates 1218c-z is identical. The AXOND gate 1214 responds when there are three or more (as determined by a threshold) identical bits in its two inputs, emits a pulse signal when this condition is detected, and records the common pattern in an output register 1278. For clarity, in FIG. 15A, an AXOND gate 1214 is shown with its pulse signal as an output and with its output register as a separate register.

A set of input lines 1250 propagates the first input to the AXOND gate 1214. Each input is electrically connected to a pull-down resistor 1252 and to the parallel input of an input register 1254 comprising a set of bits 1256. In a preferred embodiment, the input register 1254 may comprise a parallel-serial shift register such as the 7496 parallel-serial shift register. The input register 1254 is loaded with the second input to the AXOND gate 1214. Each pull-down resistor 1252 prevents the corresponding bit 1256 of the the input register 1254 from being parallel-loaded with a logic "1" unless the first input bit on a line 1250 is also a logic "1"; thus this circuit performs a bitwise logical AND on the two inputs.

Each bit 1256 of the input register 1254 is propagated to a corresponding diode 1258 and voltage-divider resistor 1260, and all the voltage-divider resistors 1260 are electrically connected via line 1262 to the positive terminal of an operational-amplifier 1264. This circuit forms a voltage summator, as is well-known in the art, and causes the op-amp 1264 to receive an input voltage which is proportional to the number of bits 1256 in the input register 1254 which are set to a logic "1". The op-amp 1264 is arranged, as is well-known in the art, as a linear amplifier, with its output on line 1266. Due to the selected gain of the linear amplifier (adjustable via a variable resistor 1268), the output on line 1266 is a logic "1" if and only if there are a predetermined number of (three or more, in a preferred embodiment) bits 1256 in the input register 1254 which are set to a logic "1". The output 1266 of the op-amp 1264 is electrically connected to a monostable multivibrator 1268a, electrically connected to produce an output pulse on line 1270.

The output pulse on line 1270 is propagated to a set of AND gates 1272, each electrically connected to a bit 1256 in the input register 1254 and each electrically connected to a switch 1274. (The switch 1274 can be connected to a logic "1" or to the input line for the first bit 1254 in the input register 1256; the effect of the latter connection is that no pattern in the input register 1254 can be recorded in the output register 1278 unless that first bit 1256 is set to a logic "1".) The output of each AND gate 1272 is propagated to a corresponding OR gate 1276, and the output of each OR gate 1276 is propagated to the parallel input of an output register 1278 comprising a set of bits 1280.

Each bit 1280 of the output register 1278 is also propagated to the input of a corresponding AND gate 1282, along with a common CLEAR line 1284, and the output of each AND gate 1282 is propagated to an input of the corresponding OR gate 1276. Thus, the output register 1278 will record the pattern present in the input register 1256 if and only if the detection pulse on line 1270 is triggered. If the CLEAR line 1284 is raised, the output register 1278 will be cleared before a new pattern is recorded; otherwise the new pattern will overlay the old pattern.

Figure 16A:
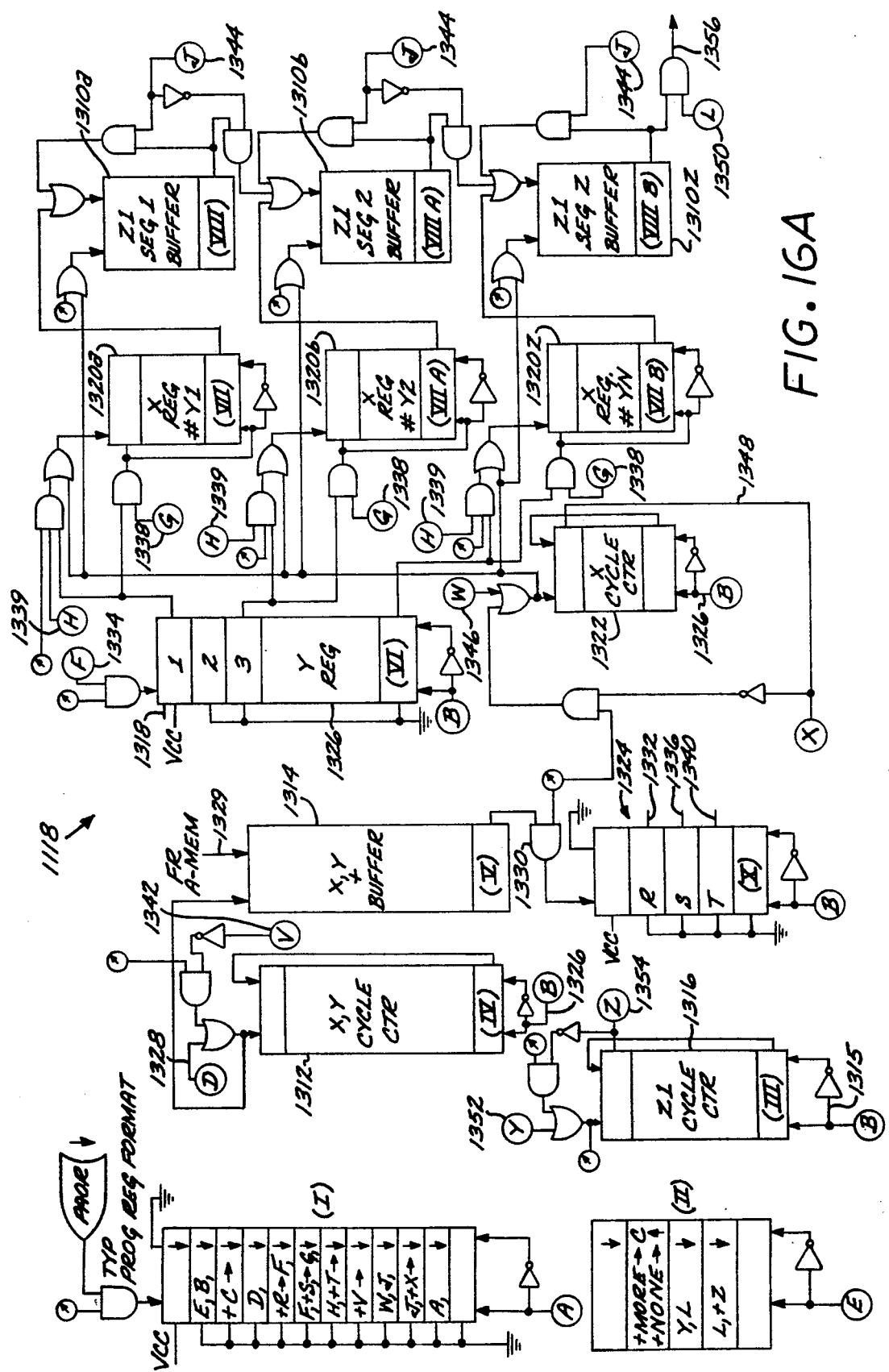
FIG. 16A is a block diagram of an X/Y-to-Z address or data translator.

FIG. 16A is a block diagram of an X/Y-to-Z address or data translator 1118. Memory address pointers 216 are recorded in an X/Y. format (disclosed with reference to FIG. 8), a two-dimensional format comprising an X-part and a Y-part and representing an address value equal to (k1 * X)+(k2 * Y). In a preferred embodiment, k1 equals 1 and k2 equals the maximum allowed value of X. The X/Y-to-Z address or data translator 1118 converts an input address value from the X/Y format to a Z form (equivalent to the format in which data is stored in a Z-mem 310), a one-dimensional format in which a bit represents an address value equal to its bit offset.

In a preferred embodiment, the X/Y-to-Z address or data translator 1118 may operate by selecting one of a plurality of Z-format segments 1310a-z (e.g. 1310i) based on the value of the X-part, and advancing a set bit to a location on the selected Z-format segment 1310i based on the value of the Y-part. This causes the value (k1 * X)+(k2 * Y) to be calculated, as is well-known in the art. The X/Y-to-Z address or data translator 1118 makes use of a set of Z-format segments 1310a-z, an X/Yi-CCR 1312, an X/Yi-buf 1314, a Z-format CCR 1316, a Z-select CCR 1318, a set of X-part segments 1320a-z (e.g. 1320i) each associated with a Z-format segment 1310, an X-part CCR 1322, and a PULSE register 1324.

Initially, signal "B" on line 1326 is triggered to reset the Z-select CCR 1318 and the X-part CCR 1322. Signal "D" on line 1328 is then triggered to cause the X/Yi-CCR 1312 to count its entire cycle, and thus causing the X/Yi-buf 1314 to input a memory address pointer 216 in an X/Y format as serial input bits on line 1329.

The first indicator bit 802 of the memory address pointer 216 is propagated through AND gate 1330 to the PULSE register 1324 to trigger signal "R" on line 1332. When signal "R" is received, signal "F" on line 1334 is triggered to cause the Z-select CCR 1318 to count its cycle, thus alternately selecting each Z-segment 1310a-z and each associated X-part segment 1320a-z one per count.

The second indicator bit 802 of the memory address pointer 216 is also propagated through AND gate 1330 to the PUL(E register 1324 to trigger signal "S" on line 1336. When signal "S" is received, cycling of the Z-select CCR 1318 is terminated, thus selecting a particular Z-segment 1310a-z (e.g. 1310i). Signal "G" on line 1338 is then triggered to reset each X-part segment 1320a-z, followed by signal "H" to cause on line 1339 each X-part segment 1320a-z to count its cycle one per count.

The third indicator bit 802 of the memory address pointer 216 is also propagated through AND gate 1330 to the PULSE register 1324 to trigger signal "T" on line 1340. When signal "T" is received, cycling of each X-part segment 1320a-zis terminated, thus selecting a particular bit within the selected Z-segment 1310a-z- (e.g. 1310i).

Signal "V" on line 1342 is then awaited, indicating that the X/Yi-CCR 1312 has completed its cycle. Signal "J" on line 1344 is triggered to enable output from the Z-format segments 1310a-z. Signal "W" on line 1346 is then triggered, and the "X" signal on line 1348 is awaited, causing the X-part CCR 1322 to count its entire cycle, and thus causing the contents of each X-part segment 1320a-zto be transmitted to its corresponding Z-format segment 1310a-z.

After each memory address pointer 216 is input and translated, a "MORE" signal (not shown), which indicates that the control system 1010 has further memory address pointers 216 to translated, is checked. If there are further memory address pointers 216 to be translated, control is transferred to the beginning (just after the reset operation using signal "B") to form a loop. Otherwise, if no further memory address pointers 216 are to be translated, control continues as follows and the presently collected set is output.

To output the collected set of address values, signal "L" on line 1350 is triggered to enable output from the set of Z-format segments 1310a-z. Signal "Y" on line 1352 is then triggered, and the "Z" signal on line 1354 is awaited, causing the Z-format CCR 1316 to count its entire cycle, and thus causing the Z-format address value to be output on line 1356.

Figure 16B:
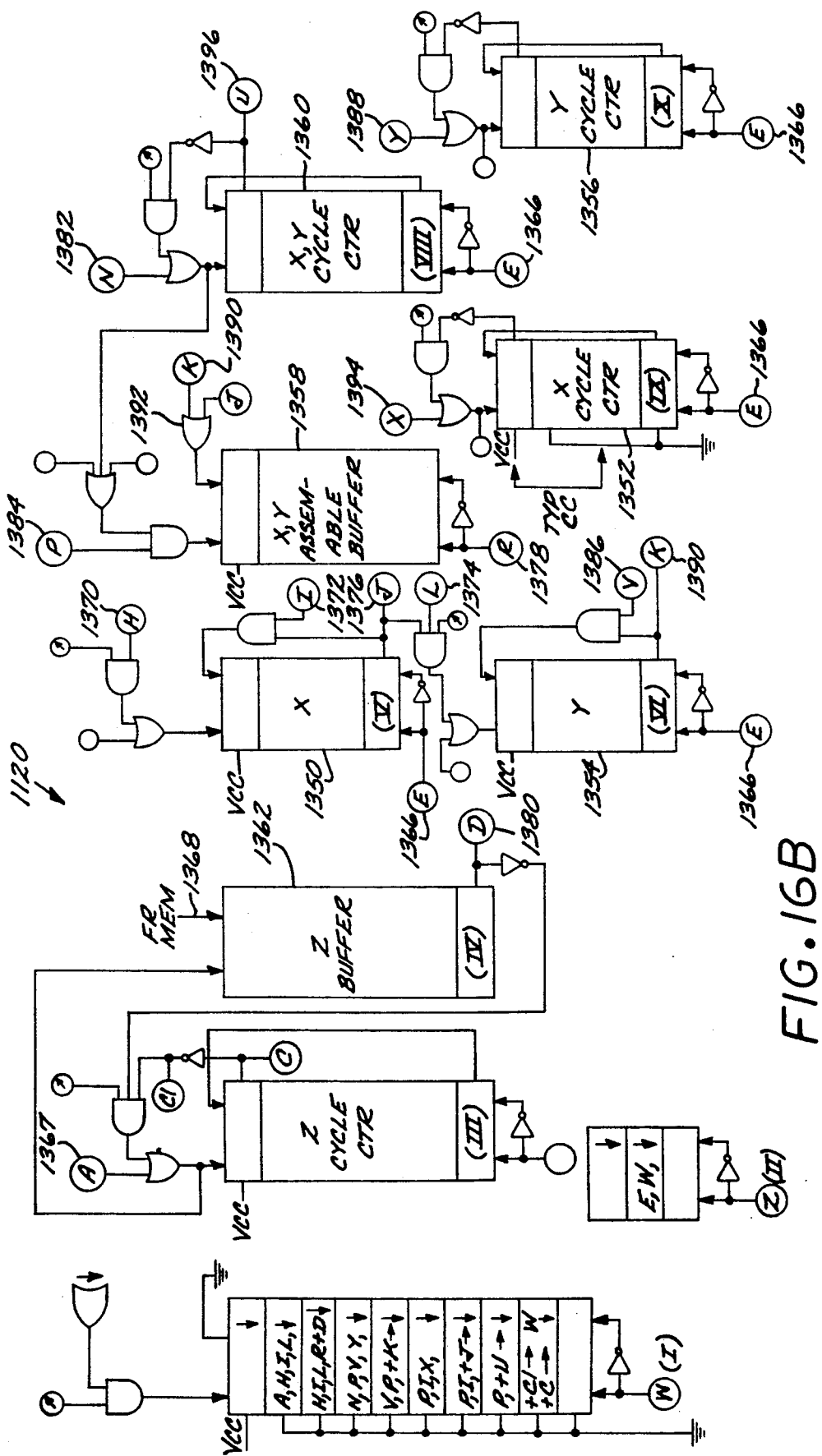
FIG. 16B is a block diagram of a Z-to-X/Y address or data translator.

FIG. 16B is a block diagram of a Z-to-X/Y address or data translator 1120. As disclosed with reference to FIG. 16A. memory address pointers 216 are recorded in an X/Y format, but it is often desirable to manipulate address values in a Z format instead. The Z-to-X/Y address or data translator 1120 converts an input address value from the Z format to the X/Y format. In a preferred embodiment, the Z-to-X/Y address or data translator 1120 may operate by dividing Z-format pulses by a predetermined divisor to create an X-part and a Y-part. The Z-to-X/Y address or data translator 1120 makes use of an Xo-buf 1350, an Xo-CCR 1352, a Yo-buf 1354, a Yo-CCR 1356, an X/Yo-buf 1358, an X/Yo-CCR 1360, a Zi-buf 1362, and a Zi-CCR 1364.

Initially, signal "E" on line 1366 is triggered to clear the Xo-buf 1350, the Xo-CCR 1352, the Yo-buf 1354, the YoCCR 1356, and the X/Yo-CCR 1360. Then signal "A" on line 1369 is triggered to cause the Zi-CCR 1364 to count its entire cycle, and thus causing the Zi-buf 1362 to input a Z-format address value as serial input bits on line 1368. Signal "H" on line 1370 is triggered to cause the Xo-buf 1350 to count its cycle, and thus causing a bit in that register to be shifted once per count of the Zi-CCR 1364. Signal "I" on line 1372 is triggered to allow recycling of bit values in the Xo-buf 1350. Signal "L" on line 1374 is triggered to enable clocking of the Yo-buf 1354. Signal "J" on line 1376 is triggered by a complete cycle of the Xo-buf 1350, and itself triggers a single clock cycle of the Yo-buf 1354.

Signals "H" on line 1370, "I" on line 1372, and "L" on line 1374 are then re-triggered, and signal "R" on line 1378 is triggered to reset the X/Yo-buf 1358. Signal "D" on line 1380 is awaited to indicate that the entire Z-format address value has been processed. At this point, an X-part and a Y-part have beer generated and must be assembled into an X/Y-format memory address pointer 216. Signal "N" on line 1382 is triggered to cause the X/Yo-CCR 1360 to count its cycle, and thus causing the X/Yo-buf 1358 to enter data; signal "P" on line 1384 is triggered to enable the X/Yo-buf 1358 to be clocked. Signal "V" on line 1386 is triggered to enable the Yo-buf 1354 to recycle its data. Signal "Y" on line 1388 is triggered to cause the Yo-CCR 1356 to count its cycle, and thus causing the Yo-buf 1354 to output its data as signal "K" on line 1390, which is entered into the X/Yo-buf 1358 through OR gate 1392.

Signals "V" on line 1386 and "P" on line 1384 are then re-triggered, and signal "K" on line 1390 is awaited. At this point, the Y-part has been assembled into the X/Y-format memory address pointer 216 in the X/Yo-buf 1358. Signals "P" on line 1384, "I" on line 1372 are re-triggered, and signal "X" on line 1394 is triggered to cause the Xo-CCR 1352 to count its cycle, and thus causing the Xo-buf 1350 to output its data as signal "J" on line 1376, which is entered into the X/Yo-buf 1358 through OP gate 1392. Finally, signal "P" on line 1384 is re-triggered, thus causing the X/Yo-buf 1358 to output the X/Y-format memory address pointer 216, and signal "U" on line 1396 is awaited to indicate that the X/Yo-CCR 1360 has completed its cycle. If further Z-format address values are presented by the control system 1010, the Z-to-X/Y address or data translator 1120 continues with its initial step to form a loop.

Figure 17:
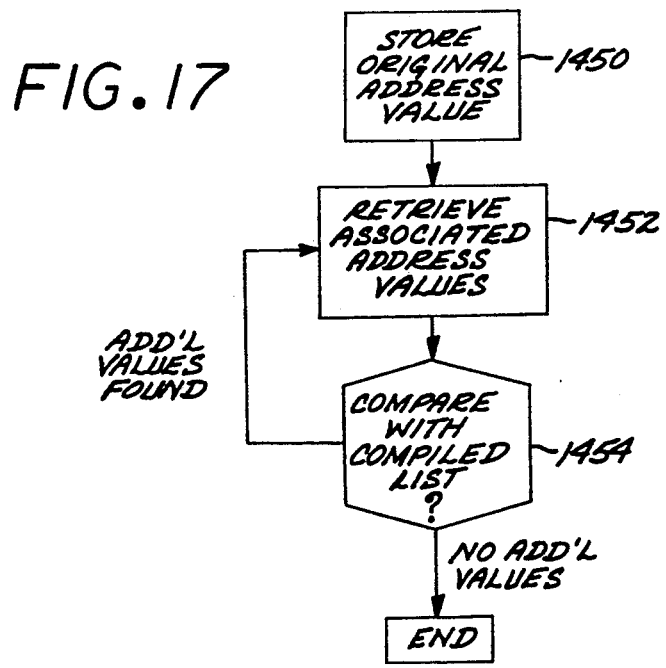
FIG. 17 is a block diagram of an address list associator.

FIG. 17 is a flow chart of a method followed by an address list associator. The address list associator 1122 compiles a list of address values which are associated with the original address value. It performs its functions as shown in the flow chart. The X/Y-to-Z address or data translator 1118 performs the actual compiling of a list of address values, as disclosed with reference to FIG. 16A.

At step 1450, the address list associator 1122 stores the original address values in a first address list register 1410. At step 1452, the address list associator 1122 retrieves all address values from the bank 110 which are associated with address values found in the first address list register 1410, and stores these associated address values in a second address list register 1412. At step 1454, the address list associator 1122 compares the address values in the second address list register 1412 with the address values in the first address list register 1410. If additional address values associatively related to the list stored in 1410 are discovered these new address values are then used to discover any additional address values stored in those address memories and are again tested against the list stored in 1412 and added to that list if they were not already present in it. In the event of such new discoveries of address values, have been found, control is transferred to step 1452 to form a loop that is used to discover any new address values and to add them to the contents of register 1410; otherwise the address values found in the first address list register 1410 are the complete list, and no further steps are taken.

The value of this operation, in the context of parallel associative contents-addressable electronic memory systems, can be illustrated with an example. The control system 1010 may direct the input to the bank 110 of several cue structures 410, and may then direct association lists of these cue structures to be compared for common elements. Software to perform this comparison would be clear to one of ordinary skill in the art and is thus not further disclosed herein. Although the compilation of the list is performed by special hardware, software methods are considered adequate to perform the comparison. The result of this two step operation is recognition by the control system of common features of the cue structures 410 which were input.

Thus, data structures 210 for each President of the United States (e.g. "WASHINGTON", "ADAMS", "JEFFERSON") may be stored in the bank 110, along with memory address pointers 216 to associated data structures. Further, data structures 210 for each political party (e.g. "DEMOCRAT", "REPUBLICAN") may also be stored in the bank 110, along with memory address pointers 216 to associated data structures. Still further, data structures 210 comprising other remarks (e.g. "ASSASSINATED", "DIED-IN-OFFICE", "RE-ELECTED") may also be stored in the bank 110, along with memory address pointers 216 to associated data structures. Then, if the control system 1010 (FIG. 13) causes cue structures 410 for several Presidents of the United States to be input to the bank 110, address values for data structures 210 which name common features of the Presidents named may be extracted.

For example, the data structure 2.10 associated with the data structures 210 "REPUBLICAN", "ASSASSINATED", "DIED-IN-OFFICE", and "RE-ELECTED"; the data structure 210 "McKINLEY" would be associated with the data structures 210 "REPUBLICAN", "ASSASSINATED", and "DIED-IN-OFFICE"; and the data structure 210 "ROOSEVELT" would be associated with the data structures 210 "DEMOCRAT",-"DIED-IN-OFFICE", and RE-ELECTED"; this is shown in the table below.

| LINCOLN | REPUBLICAN | ASSASSINATED | DIED-IN-OFFICE | RE-ELECTED |
|---|---|---|---|---|
| McKINLEY | REPUBLICAN | ASSASSINATED | DIED-IN-OFFICE | |
| ROOSEVELT | DEMOCRAT | | DIED-IN-OFFICE | RE-ELECTED |

By presenting the data structures 210 for these three Presidents, the control system 1010 can recover the facts that both Lincoln and McKinley were Republicans, that both were assassinated, that both Lincoln and Roosevelt were re-elected, and that all three Presidents died in office. By comparison of these results, the control system 1010 can also recover the fact that all Presidents who are assassinated must die in office. Similarly, by presenting the data structures for a set of qualities, the control system can recover a list of Presidents with those qualities.

While a presently preferred embodiment has been detailed, many variations are possible which remain within the scope of the present invention. Other and further detailed information about a preferred embodiment of the invention is included in a technical appendix, and hereby incorporated by reference as if fully set forth herein.

Other and further information on a sensor system which is particularly suited for use with the present invention may be found in a co-pending application, "VISUAL/VOICE INPUT RECOGNITION SENSOR", Ser. No. 0/7 001,161 now U.S. Pat. No. 4,891,602 and hereby incorporated by reference as if fully set forth herein.

I claim:

1. A memory system for storing and recovering one or more data structures, each separate data structure comprising a plurality of data elements, said memory system including:
   a plurality of memory banks, each bank comprising a plurality of memory arrays, each array comprising a plurality of memory devices each memory device for storing a plurality of data elements, one of said plurality of memory banks being selected to store a specific data structure consisting of multiple data elements;, and
   wherein the selected memory bank stores the specific data structure in each of its arrays and,
   wherein each separate copy of the specific data structure is stored starting at a particular designated combination of locations, one location in each of the several arrays of said selected bank; and
   wherein a first data element of each separate data structure is stored in a series of locations starting at a different combination of locations for each data structure, one in each separate array of the selected bank; and
   wherein each successive data element or combination of elements is stored in successive array positions that follow the starting location in each array of the bank selected for storage; and
   means for recovering any particular stored data structure from the selected memory bank by comparing the contents of each combination of memory devices so as to find data elements that are common to each given combination of memory devices being examined in a predetermined order beginning at a specified starting position in each array of the selected memory bank, and the memory system thereby recovering the complete data structure.

2. A memory system as claimed in claim 1, wherein a first data item to be recovered is identified by comparing the data stored at the starting locations of each of the arrays of the selected bank; and only those data elements that are stored in all said starting locations of the selected bank are identified as valid stored data elements by the specified memory devices and then recovered as valid data elements; and the memory system similarly recovers a second data item or items of the stored data structure by comparing the contents of the memory devices that immediately follow the specified starting locations in all arrays of the selected bank and whenever each of the memory devices in each array of the specified bank compared at that particular combination of locations contain identical stored information, the system automatically recovers that information; and the system recognize as valid data items only those data items that are detected in all arrays in the positions immediately following the specified starting position of each array of the selected bank; and similarly, the system is able to recover further successive data items by comparing the data stored in memory devices in all arrays of the selected bank that immediately follow the array positions that were just previously examined and automatically recovers all data items that are common to all of the memory devices selected for comparison at that step in data recovery and in which only those data items that are stored in all memory devices being examined at that time are outputted by the system; and wherein the system automatically repeats the above operations until such time as a specific data item that symbolizes the end of the data structure is found to be present in all arrays in the positions being examined at the step in the recovery of the complete data structure; and whereafter, the complete data structure having been recovered, the recovery process is complete and is terminated.

3. A memory system as claimed in claim 1 wherein each array has a different number of memory devices than the other arrays in the same memory bank.

4. A memory system as claimed in claim 1, further including means for selecting one or more banks through the presentation of a specific cue structure simultaneously to all arrays of each bank of the memory system; and selection means comprising means for receiving the cue structure, the cue structure comprising a plurality of cue elements; and the recovery means examining the memory devices of all banks in an order determined by the cue structure so as to determine which banks, if any, have stored a copy of the complete cue structure in each of their arrays; and thereafter recovering the data structure or structures which comprise said cue structure from each memory bank selected through the presentation of said cue structure.

5. A memory system as claimed in claim 4, wherein the stored data structure includes a location means for indicating the location of the beginning data element of a complete data structure in each array in any bank in which it is stored and wherein the means for recovering said stored data structure recovers the data structure which comprises data elements corresponding to the cue elements of the cue structure by consecutively recovering data elements of the data structure that follow the locations identified by the last cue element presented to the system and wherein the memory system thereafter repeats the above steps in the recovery process until the location means is found which location means indicates the location of the beginning data element of the data structure within each array of any bank identified by the cue structure after which the locations indicated by the location means are used to recover a complete data structure from each bank identified through the presentation of the cue structure.

6. The memory system as claimed in claim 5 wherein the location means determined through the presentation of a cue structure also indicates the location or locations of any different data structure or structures stored in all that bank's arrays or in all arrays of any other banks, which data structures have data structure or structures that were found through the presentation of a cue structure.

7. A memory system as claimed in claim 1 wherein:

each memory device may store parts of one or more data structures stored in the memory system and in which the memory devices in each array are serially connected to form a ring.

8. A memory system as claimed in claim 7, wherein each array comprises a different number of memory devices than the other arrays in the memory bank of which it is a part.

9. A memory system as claimed in claim 7, further including:

means for receiving a cue structure having a plurality of cue elements, said cue elements having a predetermined order;

means for presenting said cue elements in a predetermined order to each array of the system; and means for comparing each cue element to the data elements previously stored in the memory system in said predetermined order and for generating a signal if each said cue element in said cue structure has corresponding data elements stored in the same order in each of the arrays of any memory bank of the memory system.

10. The memory system as claimed in claim 7 further comprising:

code means for storing the data elements in memory devices in each array of a selected bank such that each succeeding data element in the respective arrays is offset from its previously arbitrarily assigned value by a predetermined amount.

11. The memory system as claimed in claim 7 further comprising review means for examining each memory array for a data structure stored therein which is identical to a data structure to be stored and, upon locating such a duplicate data structure already stored in each array of any bank, generating a signal indicating such duplication, which signal may be used to prevent the storage of a duplicate copy of the same data structure if said structure has been determined to have been stored previously in a memory bank.

12. A memory system as claimed in claim 7 wherein each array includes:
- means for providing a cue structure having at least one cue element;
- means for presenting a first cue element to each memory device simultaneously; and,
- means for selecting and marking all memory devices that have stored in them said first cue element; and
- means for presenting the remaining cue elements successively only to memory devices that immediately follow memory devices that were selected by previous cue elements; and
- means for generating a signal when data elements corresponding to each of the successive cue elements are found to be sequentially stored in successive memory devices in the same order in which the cue elements are presented.

13. A memory system as claimed in claim 12, wherein:
- each array comprises a different number of memory devices than the other arrays in its memory banks; and further comprising
- means for providing elements of the cue structure subsequent to the first cue element only to those memory devices that are immediately adjacent to and following memory devices which indicated the existence of a stored data element identical to the previous cue element.

14. A memory system as claimed in claim 7, wherein each array comprises:
- means for selecting the arrays of any particular memory bank for storing a data structure and storing that data structure in memory devices of the selected bank wherein the first data element is stored in a selected memory device of each array of said selected bank and wherein subsequent data elements are successively stored in successive memory devices in the rings comprising each array in the selected bank;
- cue means for transmitting signals that represent a cue structure comprising cue elements to memory devices of all banks in a predetermined order; and
- means for recording a response from any memory device which indicates that data elements corresponding to all successive cue elements are stored in successive memory devices in all arrays of one or more memory banks.

15. A memory system as claimed in claim 14, wherein:
- each memory device comprises:
- a memory storage shift register used to store individual bits wherein each said bit represents a different data element;
- a match shift register for detecting identifies between one or more cueing elements and the contents of any memory storage shift-register in the system and to transmit a signal to a latch component so as to indicate that an identity has been detected;
- an address shift register which stores a multi-bit pattern that designates a particular location or set of locations in the memory system which is or are the beginning locations of one or more stored data structures;
- a cue means for presenting the cue elements including means for presenting the first cue element or elements to all memory devices in all memory banks simultaneously and for presenting subsequent cue elements only to those memory devices adjacent to and connected to memory devices indicating the existence of a data element or elements corresponding to the previous cue element or elements; and
- means for generating a signal when successive memory devices equal in number to the number of cue elements presented, in each array of any memory bank are found to contain successively stored data elements corresponding to all of the cue elements in the same order as the cues were presented.

16. A memory system as claimed in claim 15, wherein each array comprises a different number of memory devices than each other array in its memory bank.

17. A memory system comprising memory locations, the memory system for storing one or more data structures, each such structure having a plurality of data elements, the system comprising;
- a plurality of memory banks each having a plurality of memory arrays, each array comprising a plurality of memory devices connected serially to form a ring of memory devices, each memory device for storing at least one data element; and
- each memory device comprising:
- a memory storage shift register used to store individual bits wherein each said bit represents a different data element;
- a match shift register for detecting identifies between one or more cuing elements and the contents of the memory storage shift-register and to transmit a signal to a latch component so as to indicate that such identity has been detected in that memory device;
- an address shift register which stores a multi-bit pattern that designates a particular location or locations in the memory system which is or are the beginning location or locations of one or more stored data structures;
- the selected memory bank, being responsive when presented with a cue structure that is part of a previously stored data structure stored in the selected bank, for generating a signal indicative a memory locations when data element corresponding to said cue structure are found in a data structure stored in all of the arrays of the selected bank.

18. A memory system as claimed in claim 17 wherein:
- each array when presented with the cue structure, generates a first signal or signals designating a specific bank or banks only when data elements corresponding to each successive cue element of said cue structure are found to be present in successive positions in each of the arrays of any particular bank or banks; and
- each designated memory bank being responsive for generating a second signal indicative of memory locations only when all arrays of that memory bank generate said first signal.

19. A memory bank as claimed in claim 18,
- each memory bank being responsive when presented with a cue structure for generating a second signal indicative of a memory location when a predetermined number of arrays, less than the total number of arrays within that bank, generates said first signal.

20. A memory system as claimed in claim 19 wherein the predetermined number of arrays required to identify a bank is one less than the total number of arrays comprising a particular bank.

21. A memory system comprising memory locations, the memory system for storing at least one data structure having a plurality of data elements, said system comprising:
- a plurality of memory banks, each of which comprises a plurality of memory arrays, each memory array storing said data structure and comprising a plurality of ordered memory devices connected serially to form a ring, each array within a respective memory bank having a different number of memory devices, each array for storing data elements in a predetermined order and the memory devices of each array being accessable in parallel;
- wherein, one of said memory banks is selected to store any specific data structure and the data structure is stored in each array of the selected bank;
- means for receiving a cue structure comprising a plurality of cue elements having a predetermined order;
- each memory device of the system being responsive when presented with the first cue element of the ordered cue structure, for generating a first signal indicative of the presence of a data element stored therein which corresponds to the first presented cue element;
- register means for storing each first signal generated by each memory device;
- each memory device also for generating said first signal when a non-first cue element is equal to one of the data elements stored therein, and said register means records that said first signal was generated by an immediately preceding memory device when said preceding memory device was presented with a preceding cue element associated with said non-first cue element;
- each array of any bank being responsive when presented with the ordered cue structure, for generating a second signal when, for all cue elements of said cue structure, said plurality of memory devices within any specific memory bank generates said first signal; and
- said memory system being responsive when presented with the cue structure, for generating a third signal indicative of a memory location when all arrays of a memory bank generate said second signal.

22. The memory system as claimed in claim 21 further comprising review means for examining each memory array of all memory banks for a data structure stored therein which is identical to a data structure to be stored and upon locating such a duplicate data structure in each array of a bank generating a signal indicating such duplication.

23. The memory system as claimed in claim 21 further comprising fault detecting means for presenting a test data pattern for storage in each memory device, for presenting a cue structure containing said test data pattern, for identifying all memory devices that do not indicate a perfect match between the stored test data pattern and the cue structure containing the test data pattern and for excluding from future participation in memory storage all such identified memory devices.

24. The memory system of claim 21 wherein each successive part of a data structure entered for storage may comprise more than one data bit, each symbolizing a separate data element; and
- wherein each cue element may comprise more than one bit, each bit symbolizing a different particular data element.

25. The memory system as claimed in claim 21 further comprising:
- code means for storing the data elements of a data structure in memory devices in each array of a selected bank such that each succeeding data element stored in the respective arrays of that selected bank is offset from its real pre-assigned, value by a predetermined integer value, and wherein said predetermined value may be the American Standard Code for Information Interchange (ASCII) value of the data element to be stored.

26. The array of claim 25 wherein the amount of offset varies as a function of the position of a stored data element in a stored data structure.

27. The array of claim 26 wherein a data element representing the ASCII space character is not stored in any memory device in the memory system.

* * * * *